United States Patent
Iwase

(10) Patent No.: US 7,479,049 B2
(45) Date of Patent: Jan. 20, 2009

(54) MANUFACTURING METHOD OF ARC TUBE HAVING A GLASS TUBE OF A FLAT-SPIRAL SHAPE, ARC TUBE, AND FLUORESCENT LAMP

(75) Inventor: Kouhei Iwase, Takatsuki (JP)

(73) Assignee: Panasonic Corporation, Osaka (JP)

( * ) Notice: Subject to any disclaimer, the term of this patent is extended or adjusted under 35 U.S.C. 154(b) by 468 days.

(21) Appl. No.: 11/357,511

(22) Filed: Feb. 17, 2006

(65) Prior Publication Data
US 2006/0197451 A1 Sep. 7, 2006

(30) Foreign Application Priority Data
Mar. 4, 2005 (JP) ............................. 2005-061035

(51) Int. Cl.
*H01J 9/00* (2006.01)
(52) U.S. Cl. ........................................ 445/22; 313/634
(58) Field of Classification Search ........... 65/108–110, 65/292; 313/493, 573–574, 634; 445/22, 445/26–27
See application file for complete search history.

(56) References Cited

U.S. PATENT DOCUMENTS

2005/0162089 A1* 7/2005 Iida et al. .................... 313/634

* cited by examiner

*Primary Examiner*—Nimeshkumar D. Patel
*Assistant Examiner*—Mary Ellen Bowman

(57) ABSTRACT

Provided is a manufacturing method of an arc tube including a flat-spiral glass tube, the manufacturing method having: a first step of forming a glass tube into a substantially circular cone shape, by winding the glass tube in softened state to a conical surface of a jig; and a second step of flattening the circular-cone-shaped glass tube into a substantially disc shape, where a distance Gb1 is substantially uniform, where the distance Gb1 is measured in a parallel direction to a plane including substantial part of the tubular axis of the disc-shaped glass tube and is between adjacent exterior walls of the circular-cone-shaped glass tube respectively belonging to: a first substantial part of a first-flat-spiral-portion scheduled portion; and a second substantial part of a second-flat-spiral-portion scheduled portion, and a distance Ge1 is longer than the distance Gb1, where the distance Ge1 is measured in the parallel direction to the plane and is: between adjacent exterior walls of the circular-cone-shaped glass tube respectively belonging to the second-flat-spiral-portion scheduled portion and a first-end-portion scheduled portion; and between adjacent exterior walls of the circular-cone-shaped glass tube respectively belonging to the first-flat-spiral-portion scheduled portion and a second-end-portion scheduled portion.

16 Claims, 11 Drawing Sheets

MANUFACTURING METHOD OF ARC TUBE HAVING A GLASS TUBE OF A FLAT-SPIRAL SHAPE, ARC TUBE, AND FLUORESCENT LAMP

This application is based on application No. 2005-061035 filed in Japan, the contents of which are hereby incorporated by reference.

BACKGROUND OF THE INVENTION (1) Field of the Invention

The present invention relates to a manufacturing method of an arc tube having a glass tube of a flat-spiral shape, the arc tube, and a fluorescent lamp including the arc tube.

(2) Related Art

Recently in the lighting field, various types of compact self-ballasted fluorescent lamps (hereinafter, simply "fluorescent lamp") are being developed as energy/resource saving light sources. One example thereof, though not yet in the actual use, is a fluorescent lamp having an arc tube shaped like a disc whose discharge path has a double flat-spiral configuration. This type of fluorescent lamp is hereinafter referred to as "flat-spiral fluorescent lamp". Such a flat-spiral fluorescent lamp is small in size compared to a conventional circular fluorescent lamp, and has characteristic advantages such as favorable luminous intensity distribution capable of realizing a round light-emission surface.

According to a conventional manufacturing method of flat-spiral fluorescent lamp, the process of forming a glass tube into a flat-spiral shape is performed as follows. A jig having a substantially circular cone shape is prepared. A softened straight glass tube is wound along a conical surface of the jig into a double spiral configuration, thereby forming an intermediate body having a substantially circular cone shape (for actual methods, please refer to West German Patent No. 860675 and West German Patent No. 871927, for example). Next, The thus-formed intermediate body is shaped into a disc shape by being pressed under a temperature of or below a softening point, thereby completing the glass tube into a flat-spiral shape (hereinafter "flat-spiral glass tube").

Meanwhile, as shown in FIG. 1, so as to obtain a small flat-spiral fluorescent lamp and to reduce luminance inconsistency of the light-emission surface at the same time, it is preferable that the distance Gb between adjacent exterior walls of a flat-spiral portion 510 of a flat-spiral glass tube 500 is uniform and short. In view of this, in the mentioned process of forming a flat-spiral glass tube, a straight glass tube is wound to a jig in a constant and comparatively short winding pitch.

In addition, it is required to keep a distance Ge between the end portion 520a (520b) and the flat-spiral portion 510 to a predetermined length or more, so as to prevent softening/deformation of the flat-spiral portion 510 adjacent to the end portion 520a (520b) attributable to heat applied by a burner or the like in the electrodes-providing process within end portions 520a and 520b. Furthermore, the distance Ge is required to be at a predetermined length or more also for the purpose of attaching bases to the end portions 520a and 520b. (Although it is possible to prevent the above-mentioned softening/deformation of the flat-spiral portion 510, by decreasing the thermal power of the burner or the like, the insufficient heating may cause sealing failure such as crack, leak and the like at the sealed portion, leading to yield factor reduction for the electrodes-providing process.)

In the stated conventional method, after the process of forming the flat-spiral glass tube, re-processing is performed to heat and soften predetermined areas of the flat-spiral portion 510 near the end portions 520a and 520b using the burners 530a and 530b for example, and to bend the predetermined areas outward so that the end portions 520a and 520b are moved to positions shown by solid lines from positions shown by imaginary lines. As a result of this re-processing, the distance Ge is increased.

However, the re-processing necessitates a process that includes heating, forming, and cooling, which takes a comparatively long time. Consequently, the manufacturing cost of the fluorescent lamp will increase. In addition, after the re-processing, the flat-spiral glass tube 500 will be deformed from the smooth double flat-spiral configuration realized using the jig. This impairs the appearance of the fluorescent lamp.

SUMMARY OF THE INVENTION

The present invention, having been conceived in light of the aforementioned problems, has an object of providing a manufacturing method of arc tube, enabling a fluorescent lamp manufacturable at low cost and having a favorable appearance.

The stated object is achieved by a manufacturing method of an arc tube including a flat-spiral glass tube, the flat-spiral glass tube being made up of: a central portion; a first end portion; a second end portion; a first flat-spiral portion formed between the central portion and the first end portion; and a second flat-spiral portion formed between the central portion and the second end portion, the flat-spiral glass tube being made of a glass tube including a central-portion scheduled portion, a first-end-portion scheduled portion, a second-end-portion scheduled portion, a first-flat-spiral-portion scheduled portion, and a second-flat-spiral-portion scheduled portion, the manufacturing method having: a first step of forming the glass tube into a substantially circular cone shape, by holding the central-portion scheduled portion of the glass tube in softened state to a vertex of a jig having a substantially circular cone shape, and winding to a conical surface of the jig at least the first-flat-spiral-portion scheduled portion and the second-flat-spiral-portion scheduled portion; and a second step of flattening the glass tube formed in the substantially circular cone shape into a substantially disc shape so that part of a tubular axis of the glass tube, which corresponds to the first-flat-spiral-portion scheduled portion and the second-flat-spiral-portion scheduled portion, is substantially included in a plane, where a distance Gb1 is substantially uniform, where the distance Gb1 is measured in a parallel direction to the plane and is between adjacent exterior walls of the circular-cone-shaped glass tube respectively belonging to a first substantial part of the first-flat-spiral-portion scheduled portion and a second substantial part of the second-flat-spiral-portion scheduled portion, and a distance Ge1 is longer than the distance Gb1, where the distance Ge1 is measured in the parallel direction to the plane and is: between adjacent exterior walls of the circular-cone-shaped glass tube respectively belonging to the first-end-portion scheduled portion and the second-flat-spiral-portion scheduled portion; and between adjacent exterior walls of the circular-cone-shaped glass tube respectively belonging to the second-end-portion scheduled portion and the first-flat-spiral-portion scheduled portion.

With the stated construction, the first step is performed so that the distance Gb1 is maintained substantially uniform, and the distance Ge1 is longer than the distance Gb1. Therefore, re-processing for lengthening the distance Ge1 after forming of the glass tube is unnecessary. Accordingly, it becomes possible to reduce the manufacturing cost of the arc tube and the fluorescent lamp, and to allow the arc tube and the fluorescent lamp to obtain a favorable appearance having little distortion.

Furthermore, because the distance Ge1 is longer than the distance Gb1, it becomes easy to heat the end portions of the flat-spiral glass tube in the electrodes-providing process, and sealing failures such as cracking and leaking are hardly expected at the sealed portions. This helps improve yields of the electrodes-providing process. Tests were conducted for manufacturing an arc tube for a flat-spiral fluorescent lamp having a tube input of 25 W. The result reveals that if using the conventional manufacturing method and without performing re-processing, the yield was about 87%. Whereas when the present invention is applied, the yield reached 99.3% at maximum, even without the re-processing. The result also shows that a fluorescent lamp having the arc tube manufactured using the present invention exhibits excellent lamp characteristics such as no occurrence of cracking or leaking at the sealed portions while in use, luminous flux of 2300 lm, lamp efficiency of 92 lm/W, and rated life of 10,000 hours or more.

In addition, the conical surface of the jig may be provided with a guiding groove onto which the glass tube is wound, the guiding groove having a substantially uniform winding pitch Dpo and a winding pitch Dpe that is longer than the winding pitch Dpo, the winding pitch Dpo corresponding in position to where the first substantial part and the second substantial part are to be positioned on the guiding groove, and the winding pitch Dpe corresponding in position to where the first-end-portion scheduled portion and the second-end-portion scheduled portion are to be positioned on the guiding groove.

With the stated construction, forming of a glass tube is performed with a simple operation of winding the glass tube along the guiding groove.

In addition, the wound glass tube is designed fit to the guiding groove, and so the glass tube hardly deviates from the winding path during or after the winding process. Accordingly, accuracy in glass tube forming is improved.

In addition, an arrangement is also possible in which the winding pitch Dpo is in a range of 0.5 mm to 2 mm, inclusive, and the winding pitch Dpe is in a range of 3 mm to 10 mm, inclusive.

With the stated arrangement, it becomes possible to manufacture a small arc tube with little luminance inconsistency.

In addition, the stated manufacturing method may have a third step of, after the second step, providing the first end portion and the second end portion with a corresponding electrode; and a fourth step of, after the third step, a) bending a portion of the first flat-spiral portion including the first end portion so that the first end portion approaches the second flat-spiral portion, and b) bending a portion of the second flat-spiral portion including the second end portion so that the second end portion approaches the first flat-spiral portion.

With the stated construction, after the step of providing electrodes, each spiral portion of the glass tube is partially bent, so that a corresponding end portion approaches the side of the spiral portion. Accordingly, an arc tube whose distance Ge is short is realized, despite the conventional notion that it is difficult to manufacture such arc tubes for fear of sealing failure, and that with the same degree of distortion as on the conventional arc tubes.

If an arc tube whose distance Ge is short is attempted to be manufactured using a conventional manufacturing method, after a bending process to lengthening the distance Ge, and providing electrodes, bending has to be performed again so as to bring the distance Ge back to its original short length. The two times of bending processes considerably distort the arc tube, impairing its appearance. This indicates remarkable advantage of the manufacturing method of the present invention compared to the conventional manufacturing methods.

In addition, after the fourth step, a distance Ge2 may be in a range between 0.5 mm or greater and smaller than 3 mm, where the distance Ge2 is measured in the parallel direction to the plane and is: between adjacent exterior walls of the flat-spiral glass tube respectively belonging to the first end portion and the second flat-spiral portion; and between adjacent exterior walls of the flat-spiral glass tubes respectively belonging to the second end portion and the first flat-spiral portion.

With the stated construction, the distance between adjacent glass tubes is made substantially uniform throughout the entire arc tube, allowing the arc tube to have a favorable appearance.

The stated object is also achieved by an arc tube having: a flat-spiral glass tube made up of a central portion, a first end portion, a second end portion, a first flat-spiral portion formed between the central portion and the first end portion, and a second flat-spiral portion formed between the central portion and the second end portion, where part of a tubular axis of the flat-spiral glass tube, which corresponds to the first flat-spiral portion and the second flat-spiral portion, is substantially included in a plane; and two electrodes, each of which is provided at a corresponding one of the first end portion and the second end portion, where the flat-spiral glass tube is made of a glass tube including a central-portion scheduled portion, a first-end-portion scheduled portion, a second-end-portion scheduled portion, a first-flat-spiral-portion scheduled portion, and a second-flat-spiral-portion scheduled portion, the flat-spiral glass tube is made by flattening the glass tube formed substantially in a circular cone shape into a substantially disc shape so that part of a tubular axis of the glass tube, which corresponds to the first-flat-spiral-portion scheduled portion and the second-flat-spiral-portion scheduled portion, is included in the plane, and a distance Gb1 is substantially uniform, where the distance Gb1 is measured in a parallel direction to the plane and is between adjacent exterior walls of the circular-cone-shaped glass tube respectively belonging to a first substantial part of the first-flat-spiral-portion scheduled portion and a second substantial part of the second-flat-spiral-portion scheduled portion, and a distance Ge1 is longer than the distance Gb1, where the distance Ge1 is measured in the parallel direction to the plane and is: between adjacent exterior walls of the circular-cone-shaped glass tube respectively belonging to the first-end-portion scheduled portion and the second-flat-spiral-portion scheduled portion; and between adjacent exterior walls of the circular-cone-shaped glass tube respectively belonging to the second-end-portion scheduled portion and the first-flat-spiral-portion scheduled portion.

With the stated construction, the arc tube is manufacturable at low cost and has a favorable appearance.

Another object of the present invention is to provide a fluorescent lamp manufacturable at low cost and has a favorable appearance.

The stated object is achieved by a fluorescent lamp having the arc tube having: a flat-spiral glass tube made up of a central portion, a first end portion, a second end portion, a first flat-spiral portion formed between the central portion and the first end portion, and a second flat-spiral portion formed between the central portion and the second end portion, where part of a tubular axis of the flat-spiral glass tube, which corresponds to the first flat-spiral portion and the second flat-spiral portion, is substantially included in a plane; and two electrodes, each of which is provided at a corresponding one of the first end portion and the second end portion, where the flat-spiral glass tube is made of a glass tube including a central-portion scheduled portion, a first-end-portion scheduled portion, a second-end-portion scheduled portion, a first-flat-spiral-portion scheduled portion, and a second-flat-spiral-portion scheduled portion, the flat-spiral glass tube is made by flattening the glass tube formed substantially in a circular cone shape into a substantially disc shape so that part of a tubular axis of the glass tube, which corresponds to the first-flat-spiral-portion scheduled portion and the second-flat-spiral-portion scheduled portion, is included in the plane, and a distance Gb1 is substantially uniform, where the distance Gb1 is measured in a parallel direction to the plane and is between adjacent exterior walls of the circular-cone-shaped glass tube respectively belonging to a first substantial part of the first-flat-spiral-portion scheduled portion and a second substantial part of the second-flat-spiral-portion scheduled portion, and a distance Ge1 is longer than the distance Gb1, where the distance Ge1 is measured in the parallel direction to the plane and is: between adjacent exterior walls of the circular-cone-shaped glass tube respectively belonging to the first-end-portion scheduled portion and the second-flat-spiral-portion scheduled portion; and between adjacent exterior walls of the circular-cone-shaped glass tube respectively belonging to the second-end-portion scheduled portion and the first-flat-spiral-portion scheduled portion.

With the stated construction, the fluorescent lamp is manufacturable at low cost and has a favorable appearance.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings.

DESCRIPTION OF THE PREFERRED EMBODIMENTS

As follows, a manufacturing method of an arc tube, the arc tube, and a fluorescent lamp, which relate to an embodiment of the present invention, are described with reference to drawings.

(Structure of Arc Tube and Fluorescent Lamp)

Figure 1:
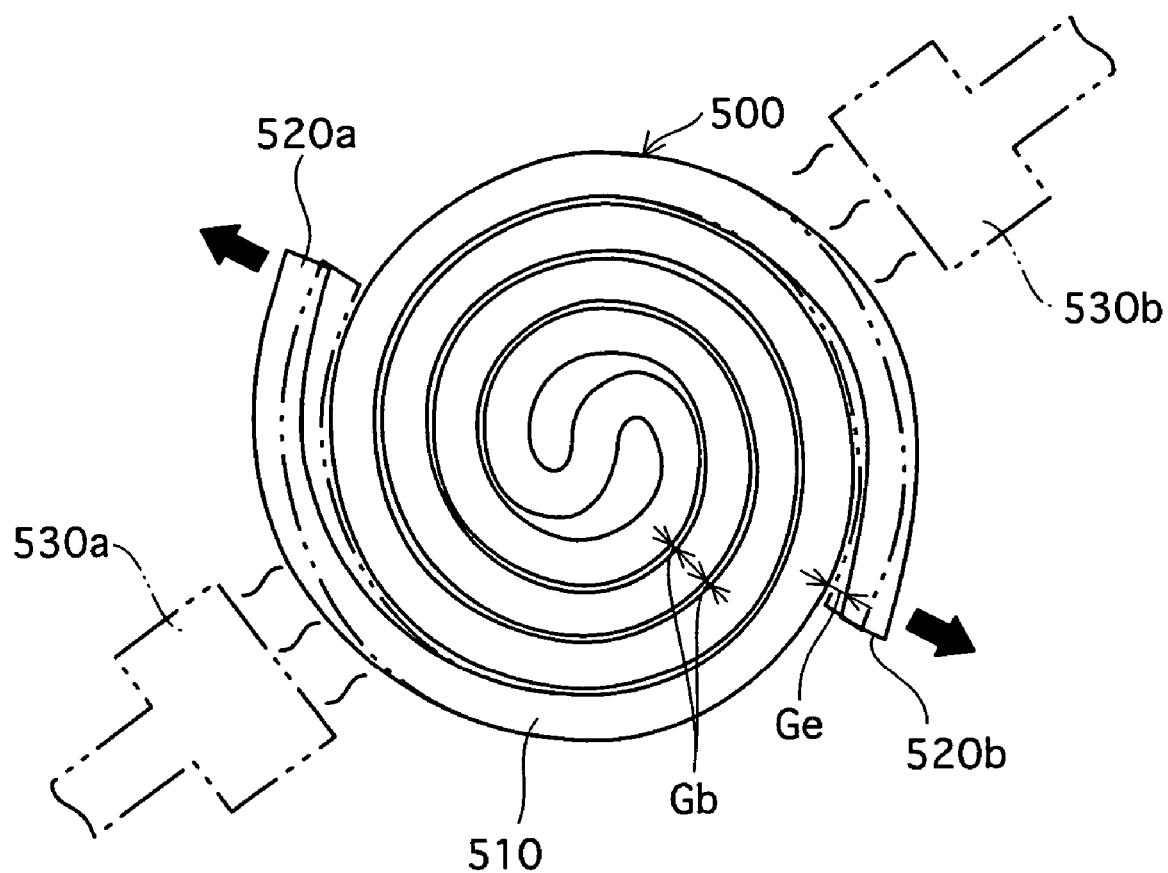
FIG. 1 is a diagram for explaining a conventional manufacturing method of fluorescent lamp.
Figure 2A:
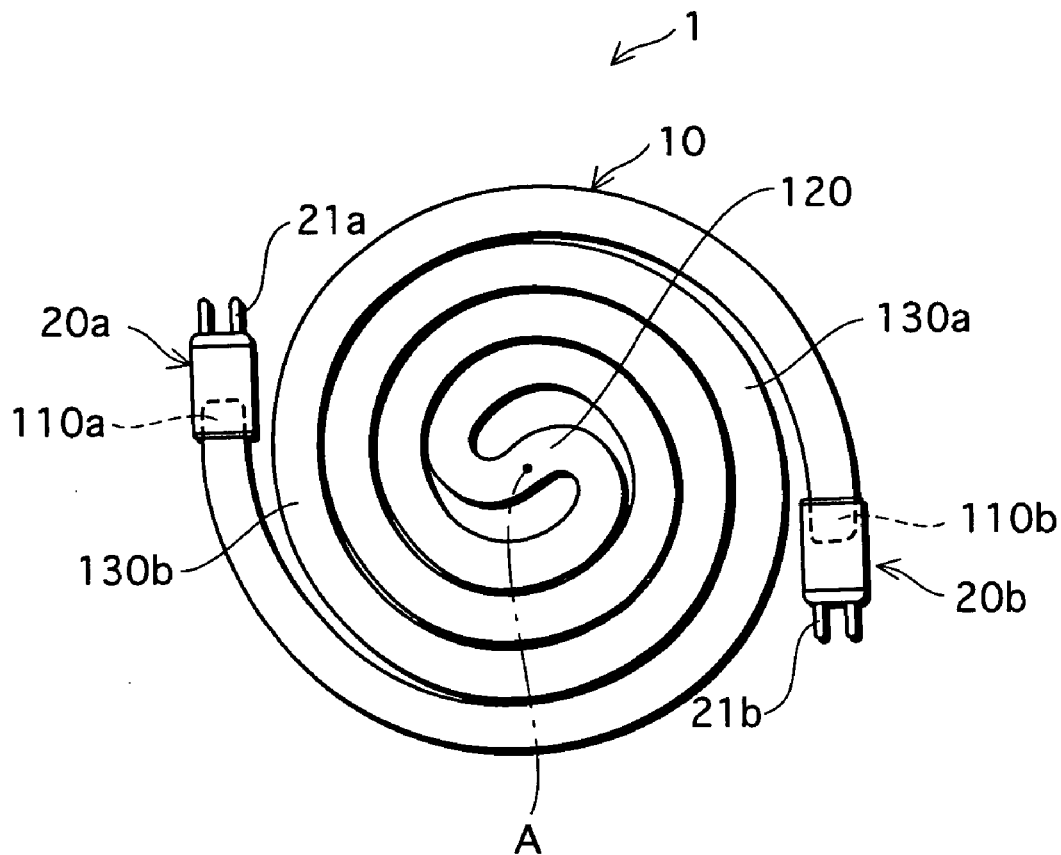
FIGS. 2A and 2B are diagrams respectively showing a fluorescent lamp according to an embodiment of the present invention, FIG. 2A showing a plan view and FIG. 2B showing a front view.
Figure 2B:
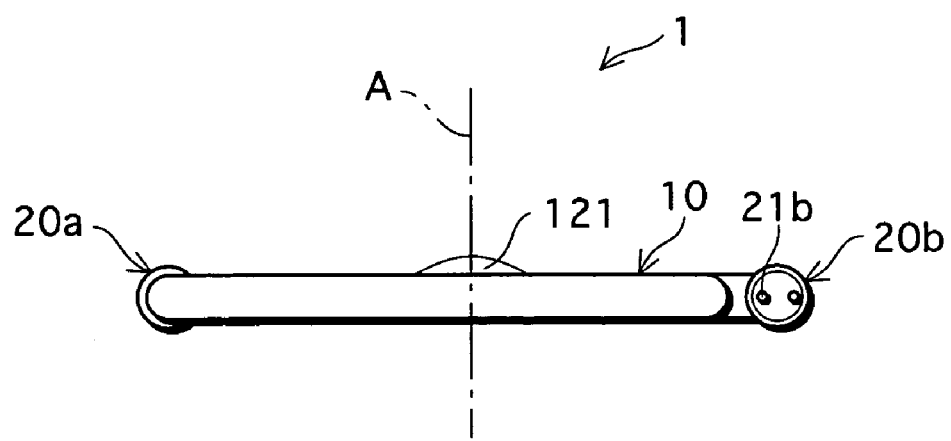

FIGS. 2A and 2B are diagrams respectively showing a fluorescent lamp according to an embodiment of the present invention. Specifically, FIG. 2A shows a plan view and FIG. 2B shows a front view.

As shown in FIGS. 2A and 2B, a fluorescent lamp 1 according to an embodiment of the present invention is a flat-spiral fluorescent lamp having a tube input of 25 W, and includes: an arc tube 10 that is an embodiment of the present invention; and bases 20a and 20b attached to the end portions of the arc tube 10 respectively. For example, the fluorescent lamp 1 is used as a wall light and a down light directly connected to the ceilings of shops and housing. The fluorescent lamp 1 is attached to an illumination device via the bases 20a and 20b, and is lit by means of an electronic ballast exclusively used for high frequency attached to the illumination device (the illumination device being not shown in the drawing). Note that the fluorescent lamp 1 is not limited to the above-described structure, and may alternatively be without the bases 20a and 20b, for example.

Figure 3A:
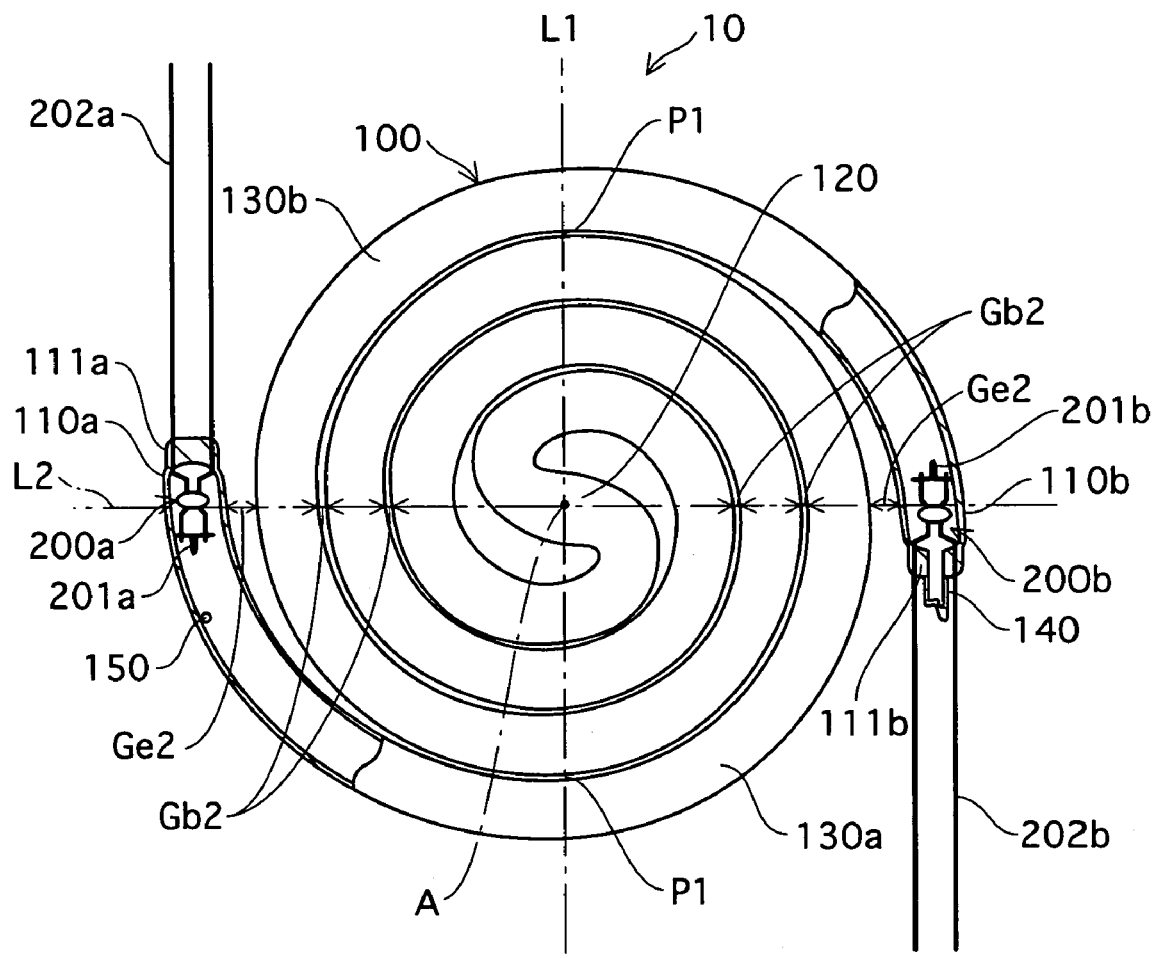
FIGS. 3A and 3B are diagrams respectively showing an arc tube, FIG. 3A showing a partly-broken plan view, and FIG. 3B showing a front view.
Figure 3B:
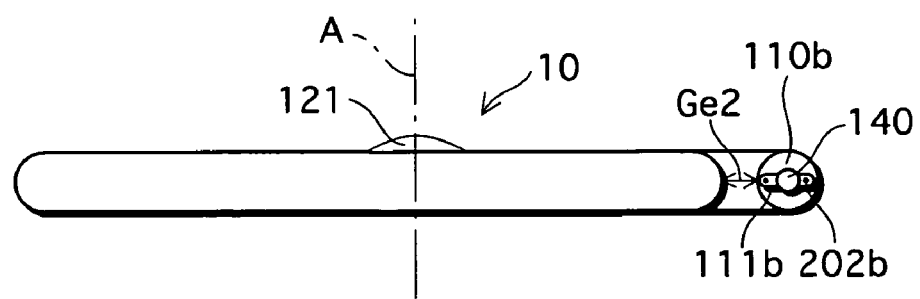
Figure 4A:
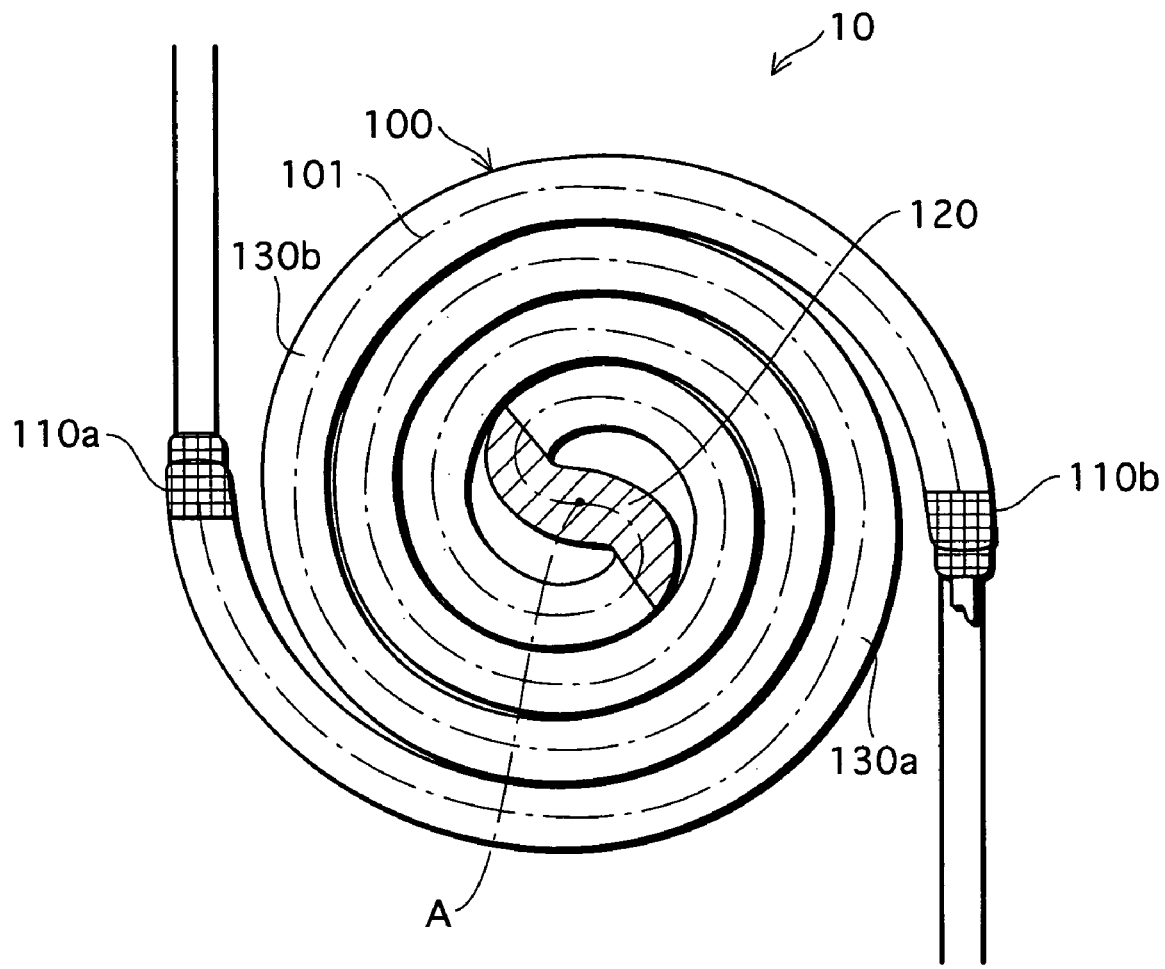
FIGS. 4A and 4B are diagrams respectively showing the arc tube, FIG. 4A showing a plan view, and FIG. 4B showing a front view.
Figure 4B:
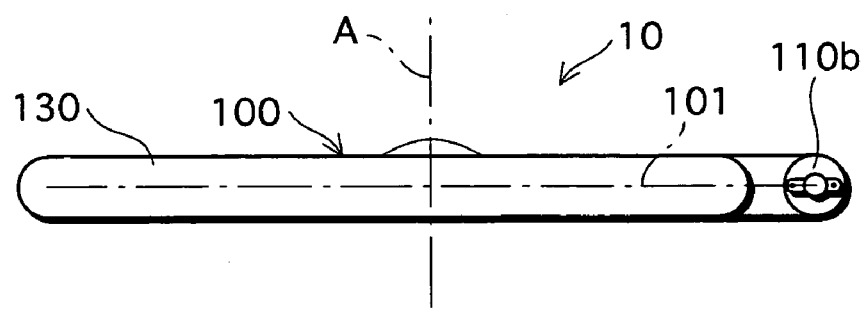

FIGS. 3A and 3B are diagrams respectively showing the arc tube. Specifically, FIG. 3A shows a partly-broken plan view, and FIG. 3B shows a front view. FIGS. 4A and 4B are also diagrams respectively showing the arc tube. Specifically, FIG. 4A shows a plan view, and FIG. 4B shows a front view.

As shown by FIGS. 3A and 3B, the arc tube 10 has the shape of a disc whose maximum outer diameter is 150 mm. The arc tube 10 includes therein electrodes 200a and 200b that are respectively sealed into a first end portion 110a and a second end portion 110a of the flat-spiral glass tube 100. The outer diameter of the arc tube 10 is 9 mm, the inner diameter of the arc tube 10 is 7.4 mm, and the entire length of the tube is 900 mm, and the distance between the electrodes 200 is 800 mm. The tube wall load is approximately 0.18 W/cm$^2$.

Although not limited to the above-stated structure, the arc tube 10 preferably has the tube's inner diameter in the range of 3-20 mm, so as to realize a small-sized fluorescent lamp 1. In view of this, the tube input is preferably in the range of 6-80 W. For example when the tube input for a fluorescent lamp is in the range of 8-40 W, it is preferable that the tube's outer diameter is in the range of 8-14 mm, the tube's inner diameter is in the range of 6-12 mm, and the tube wall load is in the range of 0.14-0.22 W/cm$^2$. For a fluorescent lamp having a tube input of 40-100 W (high wattage type), the tube's inner diameter preferably stays within the range of 12-16 mm.

The flat-spiral glass tube 100 results by forming a glass tube, which has a circular cross sectional form and is made of barium-strontium silicate glass, into a double flat-spiral configuration. Here, the barium-strontium silicate glass is a soft glass having a softening point of 675° C. As shown in FIGS. 4A and 4B, a tubular axis 101 of the flat-spiral glass tube 100 winds around a straight line A detailed later in a double flat-spiral configuration.

The tubular axis 101 of the flat-spiral glass tube 100 is included in one plane that is substantially orthogonal to the straight line A. Please note that it is not necessary that the whole of this tubular axis 101 is included in the plane. As detailed later, it is sufficient if the most part of the tubular axis 101, which corresponds to a first flat-spiral portion 130a and a second flat-spiral portion 130b, is included in one plane.

Here, the statement that "the most part of the tubular axis 101, which corresponds to the first flat-spiral portion 130a and the second flat-spiral portion 130b, is included in one plane" specifically permits a case where not the whole part of the tubular axis corresponding to the first and second flat-spiral portions 130a and 130b is included in a same plane. In other words, what is meant by the above statement is that the flat-spiral glass tube 100 has the shape substantially of a disc, regardless of whether the whole part of the tubular axis corresponding to the first and second flat-spiral portions 130a and 130b is included in a same plane or not. However, so as to enable the fluorescent lamp 1 to obtain a favorable light-emission surface of a circular shape, it is preferable that most part of the tubular axis corresponding to the first and second flat-spiral portions 130a and 130b should lie on one plane.

Structurally, the flat-spiral glass tube 100 is made up of: a central portion 120; the first end portion 110a and the second end portion 110b; and the first flat-spiral portion 130a and the second flat-spiral portion 130b. The first end portion 110a opposes the second end portion 110b with the central portion 120 therebetween. The first flat-spiral portion 130a lies between the central portion 120 and the first end portion 110a, and the second flat-spiral portion 130b lies between the central portion 120 and the second end portion 110b.

More detail is explained as follows using FIG. 4A. As shown in this drawing, in the flat-spiral glass tube 100, the area indicated by an oblique pattern corresponds to the central portion 120 of the flat-spiral glass tube 100, and the areas indicated by a lattice pattern respectively correspond to the first and second end portions 110a and 110b. Not patterned areas of the flat-spiral glass tube 100 (i.e. the areas of the flat-spiral glass tube excluding the central portion 120 and the first and second end portions 110a and 110b), correspond to first and second flat-spiral portions 130a and 130b.

The central portion 120 corresponds to part of the flat-spiral glass tube 100 held at the vertex of a substantially circular cone shape of the jig (detailed later) and the vicinity of the mentioned part of the flat-spiral glass tube 100. This central portion 120 further corresponds to a portion including and in the vicinity of the middle point of the tubular axis 101 of the flat-spiral glass tube 100. The central portion 120 also corresponds to a turning portion of the double spiral configuration of the flat-spiral glass tube 100 corresponds to the central portion 120, the turning portion being a portion of the flat-spiral glass tube 100 at which the constituting glass tube is turned to be divided into the first and second flat-spiral portions. Furthermore, the central portion 120 contains a bulged-out portion 121 that is thicker, in tube's outer diameter, than the first flat-spiral portion 130a and than the second flat-spiral portion 130b. During illumination of the fluorescent lamp 1, the bulged-portion 121 will undergo the coolest temperature of all the fluorescent lamp 1. Note that when the arc tube 10 has a tube's inner diameter of 3-16 mm, the fluorescent lamp 1 is able to obtain a favorable lamp efficiency if the temperature of the bulged-out portion 121 stays in the range of 40-50° C. during illumination.

Each of the first flat-spiral portion 130a and the second flat-spiral portion 130b is wound approximately 2 turns. Although the number of turns is not limited to 2, it is preferable that the number of turns is 1-2.5 turns, for each of the first and second flat-spiral portions 130a and 130b.

A distance Gb2 between adjacent exterior walls of the flat-spiral glass tube 100 measured in a direction parallel to a plane that includes the tubular axis 101 is substantially uniform, where the adjacent exterior walls respectively belong to a first substantial part of the first flat-spiral portion 130a and a second substantial part of the second flat-spiral portion 130b. Here, the first substantial part excludes a first end-vicinity part being a part of the first flat-spiral portion 130a formed along the tubular axis 101 in the vicinity of the first end portion 110a, and the second substantial part excludes a second end-vicinity part being a part of the second flat-spiral portion 130b formed along the tubular axis 101 in the vicinity of the second end portion 110b.

Specifically, the distance Gb2 is 2 mm. Here, the direction parallel to a plane that includes the tubular axis 101 corresponds to a direction substantially orthogonal to the straight line A shown in the drawings. So as to obtain a small fluorescent lamp 1 and to reduce color inconsistency of the light-emission surface, this distance Gb2 should stay within the range of 0.5-2 mm.

On the other hand, the distance corresponding to the distance Gb2 with respect to the first end-vicinity part and the second end-vicinity part gradually increases in the direction towards the first end portion 110a and the second end portion 110b respectively.

This is detailed with reference to FIG. 3A. To be precise, the first substantial part starts from a corresponding position P1 towards the central portion 120 in the direction of the tubular axis 101, and the second substantial part starts from a corresponding position P1 towards the central portion 120 in the direction of the tubular axis 101. Here, each of the positions P1 corresponds to ¼ turn from a corresponding one of the first and second end portions 110a and 110b along the tubular axis 101 towards the central portion 120.

Note that the positions P1 are not limited to the concrete example described above. However, so as to maintain a favorable appearance of the arc tube 10, it is preferable to set the positions P1 so that the first and second substantial parts exclude the outermost layers of the flat-spiral glass tube 100 respectively belonging to the first and second flat-spiral portions 130a and 130b.

Each position P1 may alternatively be set at ½ turn from a corresponding one of the first and second end portions 110a and 110b along the tubular axis 101 towards the central portion 120. However, so as to enable particularly favorable appearance of the arc tube 10, each position P1 is preferably positioned in the vicinity of ¼ turn from a corresponding one of the first and second end portions 110a and 110b along the tubular axis 101 towards the central portion 120.

Figure 9A:
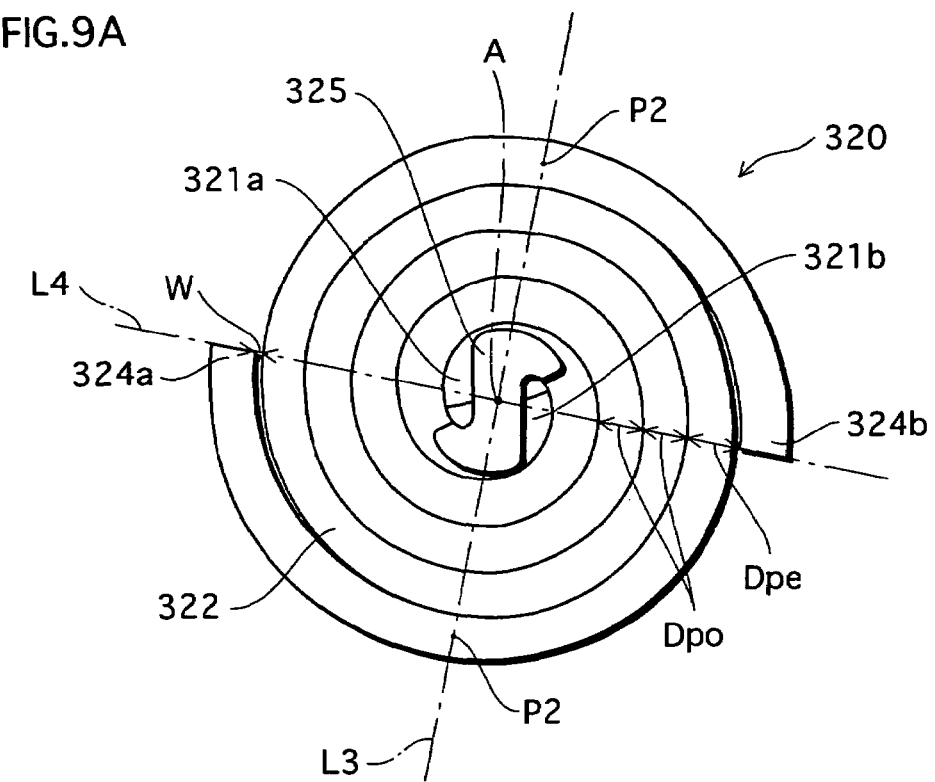
FIGS. 9A and 9B are diagrams respectively showing a jig, FIG. 9A showing a plan view and FIG. 9B showing a front view.

As shown in FIG. 9A, the straight line L1 connecting the positions P1 and the central portion 120 is substantially orthogonal to the straight line L2 connecting the central portion 120, the first end portion 110a, and the second end portion 110b. In other words, the straight line L1 intersects the straight line L2 with an angle of approximately 90°.

The first and second end portions 110a and 110b are the portions to be heated by means of a burner and the like in the electrodes-providing process, and further to be stored in the bases 20a and 20b respectively.

A distance Ge2 is 5 mm which is longer than the distance Gb2, where the distance Ge2 is measured in the direction parallel to a plane including the tubular axis 101 and is: between adjacent exterior walls respectively belonging to the first end portion 110a and the second flat-spiral portion 130b; and between adjacent exterior walls respectively belonging to the second end portion 110b and the first flat-spiral portion 130a. Here, the direction parallel to the plane including the tubular axis 101 corresponds to the direction substantially orthogonal to the straight line A.

The distance Ge2 is preferably within the range of 3-10 mm. If the distance Ge2 is 3 mm or greater, it becomes easy to heat the first and second end portions 110a and 110b with a burner and the like in the electrodes-providing process. Accordingly, it becomes possible to prevent occurrence of failure such as cracking or leaking at the sealed portions, thereby improving yields. Another advantage in addition to the above is that it becomes easy to attach the bases 20a and 20b to the arc tube 10.

On the contrary, if the distance Ge2 exceeds 10 mm, it is basically unfavorable because processing becomes difficult and the appearance of the resulting fluorescent lamp 1 will deviate from a desired appearance which is detrimental to the commercial value. However, there are cases where no inconvenience is caused even if the distance Ge2 exceeds 10 mm depending on the shape and the size of the fluorescent lamp 1.

The flat-spiral glass tube 100 is not limited to the above-stated structure, and other structures are also possible. For example, the double flat-spiral configuration of the flat-spiral glass tube 100 is not limited to a circular plan view, and may alternatively be a polygonal plan view. In addition, the cross sectional shape of the flat-spiral glass tube 100 is not limited to substantially circular, and may alternatively be substantially oval, or substantially polygonal.

The electrode 200a is made of a tungsten filament coil 201a and a pair of lead wires 202a. Likewise, the electrode 200b is made of a tungsten filament coil 201b and a pair of lead wires 202b. The electrode 200a is attached airtight to the first end portion 110a with the filament coil 201a placed inside the flat-spiral glass tube 100 using a beads glass mounting method. Likewise, the electrode 200b is attached airtight to the second end portion 110b with the filament coil 201b placed inside the flat-spiral glass tube 100 using the beads glass mounting method.

In addition, an exhaustion tube 140 is provided for the first end portion 110b of the flat-spiral glass tube 100, in a state that the tip of the exhaustion tube 140 is attached airtight to the first end portion 110b. The exhaustion tube 140 is used for evacuating the arc tube 10 and for enclosing rare gas in the arc tube 10.

To the inner surface of the arc tube 10, a phosphor layer (not shown in the drawings) is formed. In addition, mercury 150 and rare gas (not shown in the drawings) are enclosed in the arc tube 10.

The phosphor layer is made of a rare-earth phosphor composed of: $Y_2O_3$:Eu (red phosphor); $LaPO_4$:Ce,Tb (green phosphor); and $BaMg_2Al_{16}O_{27}$:Eu,Mn (blue phosphor). Note that the phosphor layer is not limited to the above-stated composition, as long as it is made of a publicly-known rare-earth phosphor.

The mercury 150 is enclosed in the flat-spiral glass tube 100 in a single form in the amount of 5 mg. Note that the enclosure form of the mercury 150 is not limited to the single form, as long as the vapor pressure characteristic of the mercury in the arc tube 1 during illumination of the fluorescent lamp 1 is substantially the same as the vapor pressure characteristic of the single-form mercury. For example, the mercury 150 may be enclosed in an amalgam form such as zinc mercury, tin mercury, and bismuth/indium mercury.

Buffer gas is argon (Ar), and is enclosed in the flat-spiral glass tube 100 at an enclosure pressure of approximately 400 Pa. Note that the buffer gas is not limited to argon, and may alternatively be neon (Ne) or Krypton (Kr). Still alternatively, the buffer gas may be a mixture gas in which argon, neon, and krypton are mixed at a predetermined ratio.

The base 20a has a pair of power-source connection terminal pins 21a that electrically connects the base 20a to the pair of lead wire 202a of the electrode 200a. Likewise, the base 20b has a pair of power-source connection terminal pins 21b that electrically connects the base 20b to the pair of lead wire 202b of the electrode 200b. The bases 20a and 20b are attached to the first and second end portions 110a and 110b, respectively, using adhesives for example.

(Manufacturing Method of Arc Tube)

A manufacturing method of an arc tube according to an embodiment of the present invention is described as follows with reference to related drawings. The manufacturing method of the arc tube 10 according to an embodiment of the present invention is characterized in its processing of manufacturing the flat-spiral glass tube 100, and the other processing is the same as in the case of the conventional technology. Therefore, only the processing of manufacturing the flat-spiral glass tube 100 is described in detail, and the other processing is either omitted for description or only simply described.

1. Entire Flow

First of all, the following briefly explains the entire flow of the manufacturing method of the arc tube 10.

Figure 5A:
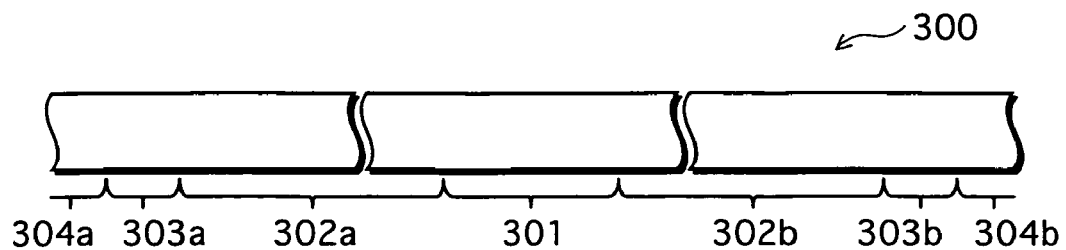
FIGS. 5A, 5B, and 5C are diagrams illustrating the change process that a glass tube undergoes to be formed into a flat-spiral glass tube, FIG. 5A illustrating a glass tube from which a spiral-spiral glass tube is formed, FIG. 5B illustrating an intermediate body, and FIG. 5C illustrating a complete flat-spiral glass tube.
Figure 5B:
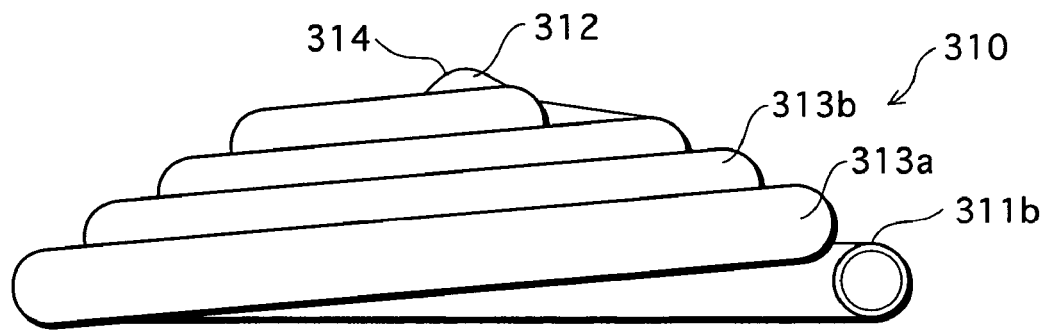
Figure 5C:
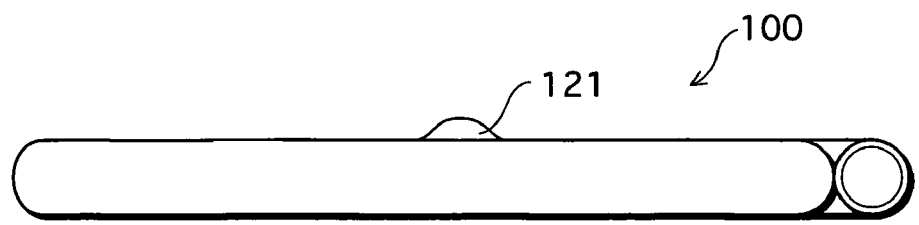

FIGS. 5A, 5B, and 5C are diagrams illustrating the change process that a glass tube undergoes to be formed into a flat-spiral glass tube. Specifically, FIG. 5A illustrates a glass tube from which a spiral-spiral glass tube is formed, FIG. 5B illustrates an intermediate body, and FIG. 5C illustrates a complete flat-spiral glass tube.

Figure 6A:
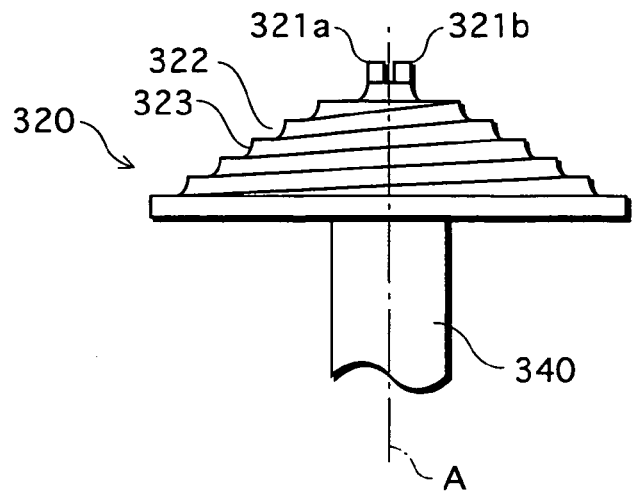
FIGS. 6A, 6B, and 6C are diagrams for explaining a forming process, FIG. 6A illustrating a step of mounting a jig to a driving apparatus, FIG. 6B illustrating a step of winding a glass tube to the jig, and FIG. 6C illustrating a step of removing the glass tube from the jig.
Figure 6B:
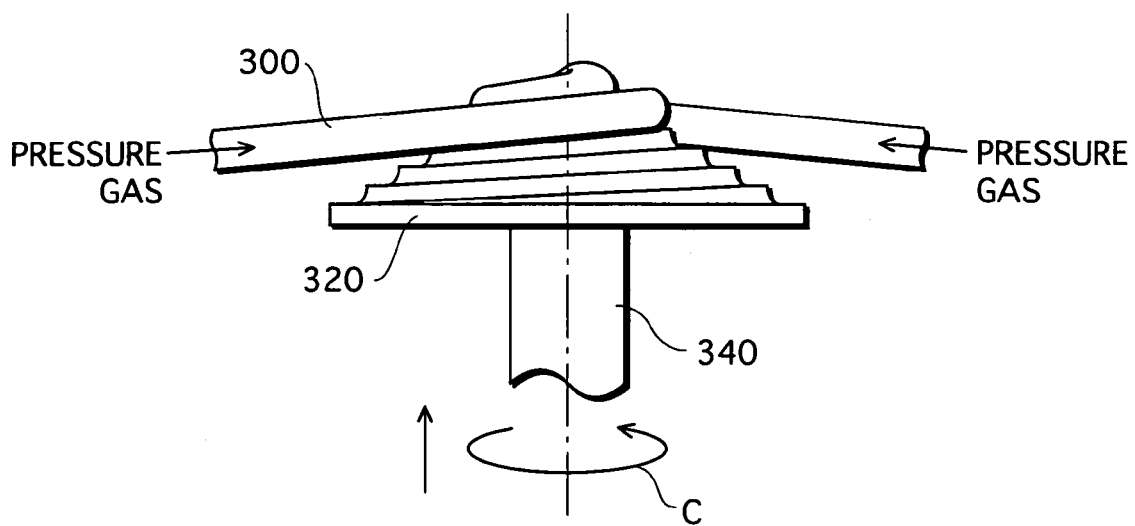
Figure 6C:
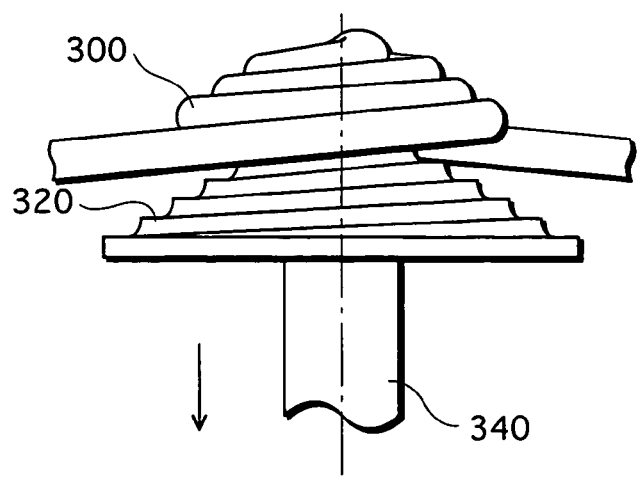

FIGS. 6A, 6B, and 6C are diagrams for explaining a forming process. Specifically, FIG. 6A illustrates a step of mounting a jig to a driving apparatus, FIG. 6B illustrates a step of winding a glass tube to the jig, and FIG. 6C illustrates a step of removing the glass tube from the jig.

Figure 7A:
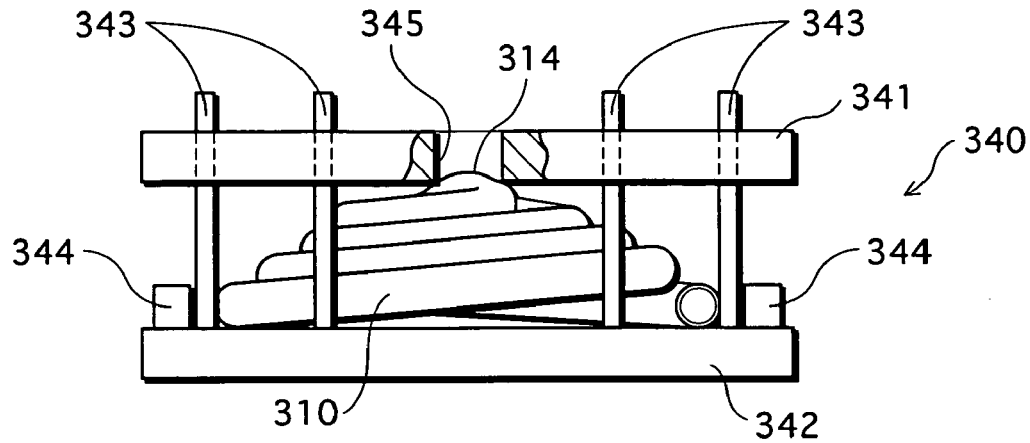
FIGS. 7A, 7B, and 7C are diagrams for explaining a flattening process, FIG. 7A illustrating a step of setting an intermediate body to a flattening apparatus, FIG. 7B illustrating a step of heating the intermediate body, and FIG. 7C illustrating a step of flattening the intermediate body by means of applied pressure.
Figure 7B:
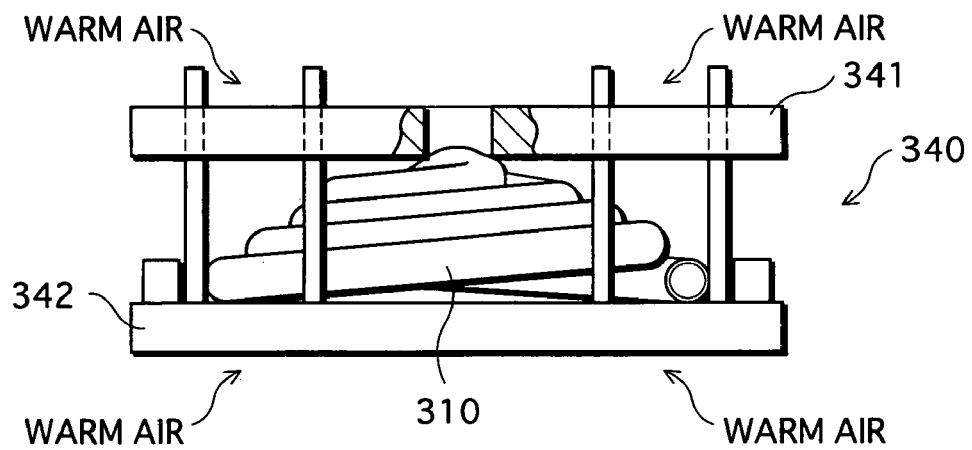
Figure 7C:
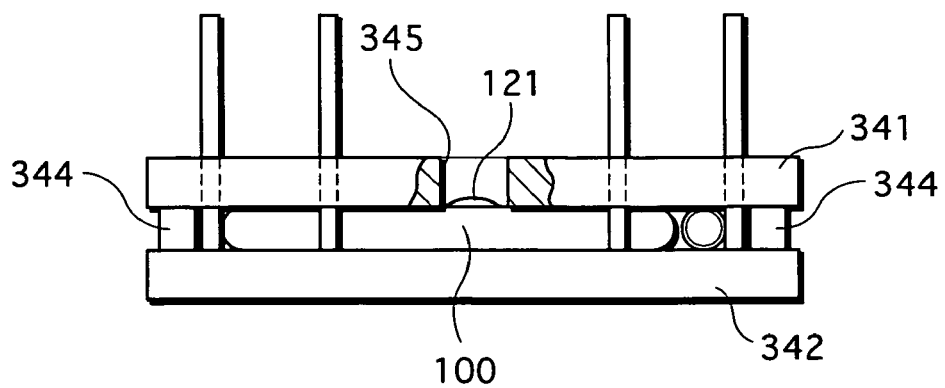

FIGS. 7A, 7B, and 7C are diagrams for explaining a flattening process. Specifically, FIG. 7A illustrates a step of setting an intermediate body to a flattening apparatus, FIG. 7B illustrates a step of heating the intermediate body, and FIG. 7C illustrates a step of flattening the intermediate body by means of applied pressure.

Figure 8A:
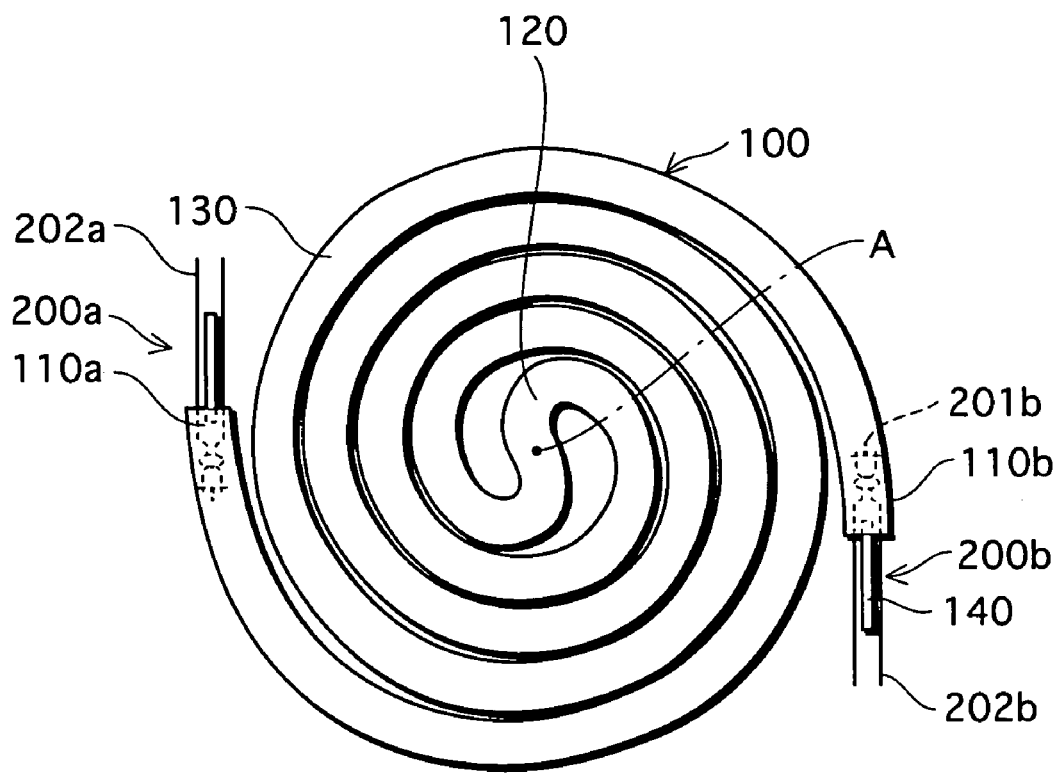
FIGS. 8A and 8B are diagrams for explaining an electrodes-providing process, FIG. 8A illustrating a step of placing electrodes and an exhaustion tube to the ends of the spirally-formed glass tube, and FIG. 8B illustrating a step of sealing the ends of the flat-spiral glass tube by means of pinch blocks.
Figure 8B:
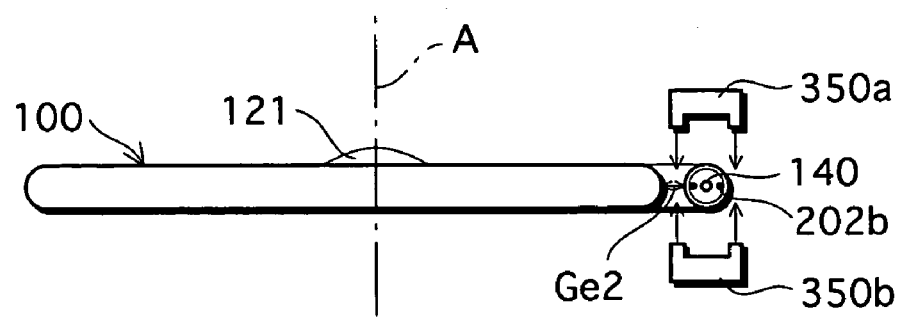

FIGS. 8A and 8B are diagrams for explaining an electrodes-providing process. Specifically, FIG. 8A illustrates a step of placing electrodes and an exhaustion tube to the ends of the spirally-formed glass tube, and FIG. 8B illustrates a step of sealing the ends of the flat-spiral glass tube by means of pinch blocks.

In manufacturing the flat-spiral glass tube 100, the forming process is performed (the first step). In the forming process, an intermediate body 310 is made from a glass tube 300 as a first step of the forming process. In the forming process, a glass tube 300, which is straight, is prepared first, as shown in FIG. 5A. The glass tube 300 is softened by means of heat, so as to be wound to a conical surface of a jig 320 detailed later. Finally, an intermediate body 310 as shown in FIG. 5C is complete. The completed intermediate body 310 has a substantially circular cone shape, with the tubular axis thereof being wound in a double spiral configuration.

In detail, the intermediate body 310 is formed as follows. A central-portion scheduled portion 312 of a softened glass tube 300, which is formed into the central portion 120, is held to the vertex of the jig 320 having a substantially circular cone shape. Next, of the glass tube 300, at least a first-flat-spiral-portion scheduled portion 313a and a second-flat-spiral-portion scheduled portion 313b are wound along the conical surface of the jig 320. Here, the first- and second-flat-spiral-portion scheduled portions 313a and 313b are portions to be formed into the first and second flat-spiral portions 130a and 130b, respectively.

Note that the intermediate body 310 corresponds to the thus-formed glass tube from which removal portions 304a and 304b are removed. The removal portions 304a and 304b are detailed later.

Following this, a phosphor-layer forming process is performed. In the phosphor-layer forming process, phosphor is applied to the inner surface of the intermediate body 310, and then the intermediate body 310 is heated for firing the phosphor.

Next, the flattening process is performed (the second step). In the flattening process, the intermediate body 310 is heated again, thereby allowing flattening by means of application of pressure, so that the intermediate body 310 of a circular cone shape is changed into a disc shape (See FIG. 5C). Note that the firing of phosphor performed in the phosphor-layer forming process may be performed utilizing the heat generated in the flattening process. This would help improve the manufacturing efficiency and reduce the manufacturing cost.

Next, an electrodes-providing process is performed. As shown in FIGS. 8A and 8B, in the electrodes-providing process, electrodes 200a and 200b are sealed into the first end portion 110a and the second end portion 110b of the flat-spiral glass tube 100, respectively. To be more specific, the first end portion 110a, in which the electrode 200a is inserted, is heated and softened by means of burners and the like placed to oppose each other in the direction of the straight line A with the first end portion 110a therebetween. Likewise, the second end portion 110b, in which the electrode 200b and the exhaustion tube 140 are inserted, is heated and softened by means of a pair of burners placed to oppose each other in the direction of the straight line A with the second end portion 110b therebetween. Here, the straight line A corresponds to the direction substantially orthogonal to the plane including the tubular axis 101 of the flat-spiral glass tube 100. After this, two pairs of pinch blocks 350a and 350b are used for sealing the first and second end portions 110a and 110b. Specifically, pinch blocks 350a and 350b are placed to oppose each other in the direction of the straight line A to crush the softened portion near the first end portion 110a. In the same manner, a pair of pinch blocks 350a and 350b are placed to oppose each other in the direction of the straight line A to crush the softened portion near the second end portion 110b. As a result, the crushed/sealed portions 111a and 111b are formed as a plate form substantially parallel to the mentioned plane that includes the tubular axis 101, as shown in FIGS. 3A and 3B.

Here, because of a comparatively long distance Ge2, heating performed in providing the electrodes 200a and 200b into the first and second end portions 110a and 110b of the flat-spiral glass tube 100 will not soften or deform any portions of the first and second flat-spiral portions 130a and 130b adjacent to the first and second end portions 110a and 110b.

Bases 20a and 20b are respectively attached to ends of the thus-manufactured arc tube 10, thereby completing a fluorescent lamp 1.

2. Forming Process

The following describes the forming process in detail.

The glass tube 300, from which the flat-spiral glass tube 100 is made, has the following dimensions: outer diameter of 9 mm; inner diameter of 7.4 mm; and length of 1500 mm. As shown in FIG. 5A, the glass tube 300 is made up of: a central-portion scheduled portion 301; a first-flat-spiral-portion scheduled portion 302a; a second-flat-spiral-portion scheduled portion 302b; a first-end-portion scheduled portion 303a; a second-end-portion scheduled portion 303b; and the removal portions 304a and 304b. Specifically, the central-portion scheduled portion 301 will be formed into a central portion 120 of the flat-spiral glass tube 100. The first-flat-spiral-portion scheduled portion 302a will be formed into the first flat-spiral portion 130a. The second-flat-spiral-portion scheduled portion 302b will be formed into the second flat-spiral portion 130b. The first-end-portion scheduled portion 303a will be formed into the first end portion 110a. The second-end-portion scheduled portion 303b will be formed into the second end portion 110b. Finally, the removal portions 304a and 304b, already mentioned, will be removed after the glass tube 300 has been formed into the intermediate body 310.

Figure 9B:
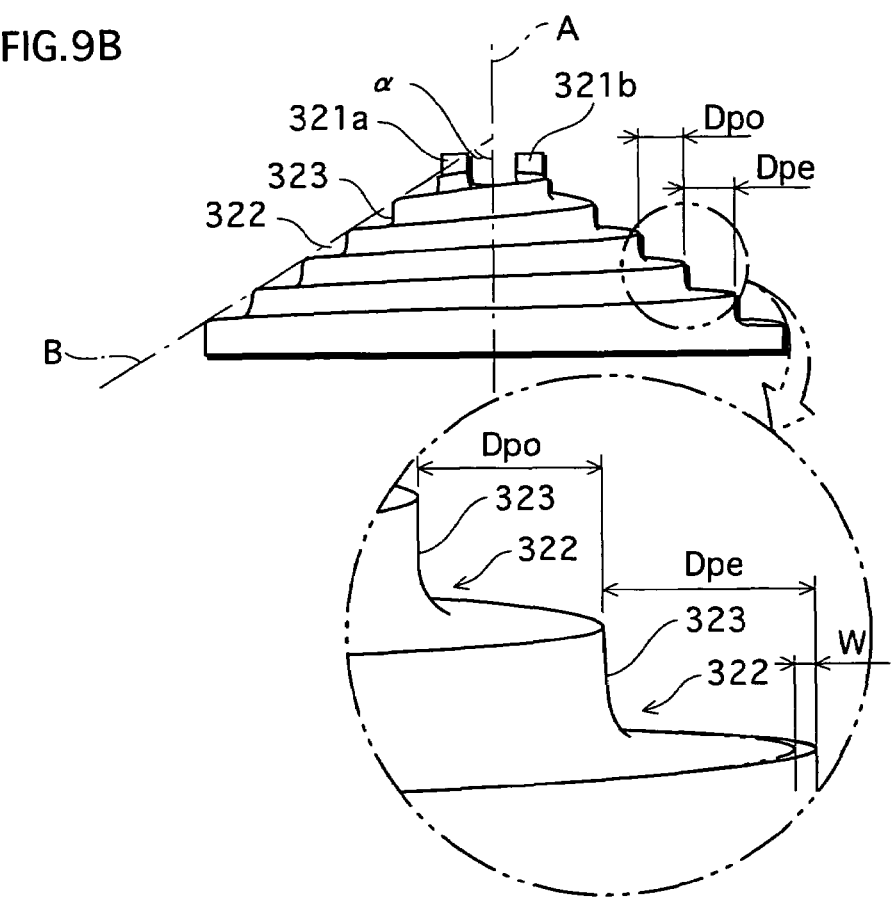

FIGS. 9A and 9B are diagrams respectively showing a jig 320. Specifically, FIG. 9A shows a plan view and FIG. 9B shows a front view. The glass tube 300 is formed into the intermediate body 310 having a substantially circular cone shape with use of the jig 320 of FIGS. 9A and 9B.

The jig 320 has a substantially circular cone shape. At the vertex of the cone, a pair of holding portions 321a and 321b is formed. With respect to the conical surface of the cone, a guiding groove 322 is formed by making corresponding part of the conical surface concave. Needless to say, the jig 320 is not required to have the shape of a circular cone in the strict sense, as long as it is recognizable as a substantially circular cone shape.

Here, assume that the jig 320 has the shape of a circular cone in the strict sense. Then the straight line A shown in FIG. 9B corresponds to a line connecting the vertex of the assumed circular cone and the center of the bottom surface of the assumed circular cone. The straight line A also corresponds to the axis of rotation of the jig 320. In addition, the straight line B functions as a generator of a conical surface of the assumed circular cone. Note that the angle α formed between the straight line A and the straight line B is set as approximately 53°, however of course is not limited to the value of approximately 53°.

In the present invention, when the guiding groove 322 is already formed, the "conical surface of the jig" means a conical surface of the assumed circular cone. Meanwhile, when the guiding groove 322 or the like has not been formed yet and there is actually a conical surface, the "conical surface of the jig" means the actual conical surface.

The holding portions 321a and 321b are used in winding the glass tube 300 to the jig 320, to fix the central-portion scheduled portion 301 of the glass tube 300. Specifically, the central-portion scheduled portion 301 will be placed between the holding portions 321a and 321b.

The guiding groove 322 is formed on the conical surface of the jig from the vertex to the lower end, corresponding in position to the winding path of the glass tube 300. Specifically, the guiding groove 322 is formed as a double spiral configuration with the straight line A as the axis of rotation, and with the space between the holding portions 321a and 321b functioning as a turning portion.

As FIG. 9B shows, the guiding groove 322 has a cross section substantially having a substantially L-shape, which has an abut surface 323 that runs spirally and in parallel to the straight line A. The glass tube 300 is wound so that the side of the glass tube 300 near the straight line A is made abut on the abut surface 323. Needless to say, the cross section of the guiding groove 322 is not limited to the substantially L-shape, and may alternatively be an arc shape that has a curvature fit for the form of the glass tube 300, for example.

It is also possible to form the guiding groove 322 by making part of the conical surface convex, instead of making corresponding part of the conical surface concave. In addition, the guiding groove 322 is not necessarily continuous throughout its length, and may be partly discontinuous. For example, the guiding groove 322 may be made of a plurality of groove sections provided with a certain distance between each other. Furthermore the conical surface may be flat without any guiding groove 322.

The guiding groove 322 has a substantially uniform winding pitch Dpo both for: a portion of the guiding groove 322 corresponding to a first substantial part of the first-flat-spiral-portion scheduled portion 302a of the glass tube 300; and a portion of the guiding groove 322 corresponding to a second substantial part of the second-flat-spiral-portion scheduled portion 302b of the glass tube 300. Specifically, the winding pitch Dpo is set as 11 mm. On the other hand, the guiding groove 322 has a winding pitch Dpe of 14 mm, for both of the first and second end portions 324a and 324b, i.e. for both portions corresponding to the first- and second-end-portion scheduled portions 303a and 303b. This means that the winding pitch Dpe is longer than the winding pitch Dpo by the width of W (3 mm) as shown in FIG. 9B.

In the above explanation, "a portion of the guiding groove 322 corresponding to a first substantial part of the first-flat-spiral-portion scheduled portion 302a of the glass tube 300" is a portion of the guiding groove 322 from the middle portion 325 to a position P2 corresponding to ¼ turn from the first end portion 324a. Likewise, "a portion of the guiding groove 322 corresponding to a second substantial part of the second-flat-spiral-portion scheduled portion 302b of the glass tube 300" is a portion of the guiding groove 322 from the middle portion 325 to a position P2 corresponding to ¼ turn from the second end portion 324b.

As shown in FIG. 9A, the straight line L3 intersects the straight line L4 with an angle of approximately 90°, where the straight line L3 connects the position P2 and the middle portion 325, and the straight line L4 connects the first and second ends 324a and 324b with the middle portion 325. In other words, the straight line L3 is substantially orthogonal to the straight line L4.

A winding pitch (Dpo) for the guiding groove 322 at the position P2 is 11 mm. From the position P2 towards the first and second end portion s324a and 324b, the winding pitch widens gradually, and at the first and second end portions 324a and 324b (i.e. ¼ turn from the positions P2 respectively), the winding pitch is longer by the width W than at the positions P2. Specifically, the winding pitch (Dpe) at the first and second end portions 324a and 324b of the guiding groove 322 is 14 mm.

With respect to the jig 320 of the present embodiment, the winding pitch for the guiding groove 322 means a distance between adjacent abut surfaces 323 of the spirally formed guiding groove 322. The reason why the winding pitch is defined using the distance between adjacent abut surfaces of the spiral is that the glass tube 300 will be wound to the jig 320 to be abut against the abut surfaces 323, and so the winding pitch of the glass tube 300 will be defined depending on the distance between adjacent abut surfaces 323 of the spiral.

Here, it is alternatively possible to define the winding pitch using a different distance from the distance between adjacent abut surfaces 323.

The glass tube 300 will be formed into the shape of the intermediate body 310, by holding the central-portion scheduled portion 301 to the vertex of the jig 320, and winding the first-flat-spiral-portion scheduled portion 302a, the second-flat-spiral-portion scheduled portion 302b, the first-end-portion scheduled portion 303a, and the second-end-portion scheduled portion 303b in double spiral configuration along the conical surface of the jig 320.

As shown in FIG. 6A, the jig 320 is mounted to the shaft 340 of a driving apparatus (not shown in the drawing). The axis of rotation of the jig 320, which is shown by the straight line A, corresponds to the axis of rotation of the shaft 340. Accordingly, the straight line A in FIGS. 6A, 6B, and 6C correctively shows both axes of rotation.

In manufacturing the intermediate body 310, a heating furnace is used for example to heat, up to about 780° C., the central-portion scheduled portion 301, the first- and second-flat-spiral-portion scheduled portions 302a, 320b, and the first- and second-end-portion scheduled portions 303a, 303b thereby softening these portions. Then the central-portion scheduled portion 301 of the glass tube 300 is inserted to the holding portions 321a and 321b of the jig 320. As shown in FIG. 6B, while the both ends of the glass tube 300 are held in removable state, the driving apparatus is driven to raise the jig 320 while rotating the jig 320 into the direction of the arrow C at the same time, as shown in FIG. 6B.

As a result, the central-portion scheduled portion 301 of the glass tube 300 is held between the holding portions 321a and 321b, and the first- and second-flat-spiral-portion scheduled portions 302a and 302b are wound along the guiding groove 322 of the jig 320. Note that pressure-controlled gas such as air, nitrogen, argon, and the like is blown into the glass tube 300 during the winding processing for the purpose of preventing the glass tube 300 from deforming.

After the glass tube 300 has been wound to the jig 320 and the temperature of the glass tube 300 has been lowered to harden the glass constituting the glass tube 300, the hardened glass tube 300 is removed from the jig 320 as shown in FIG. 6C. Then the removal portions 304a and 304b of the glass tube 300 are removed, thereby completing the intermediate body 310.

Figure 10A:
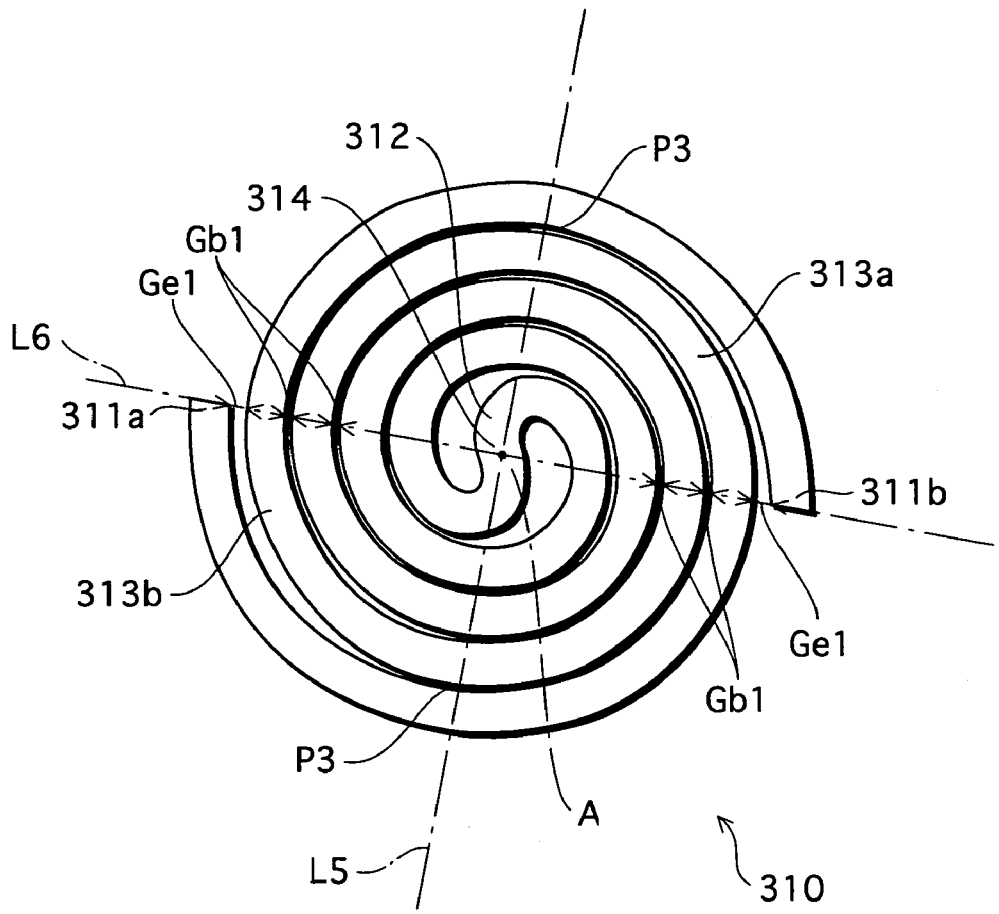
FIGS. 10A and 10B are diagrams respectively showing an intermediate body, FIG. 10A showing a plan view and FIG. 10B showing a partly-broken front view.
Figure 10B:
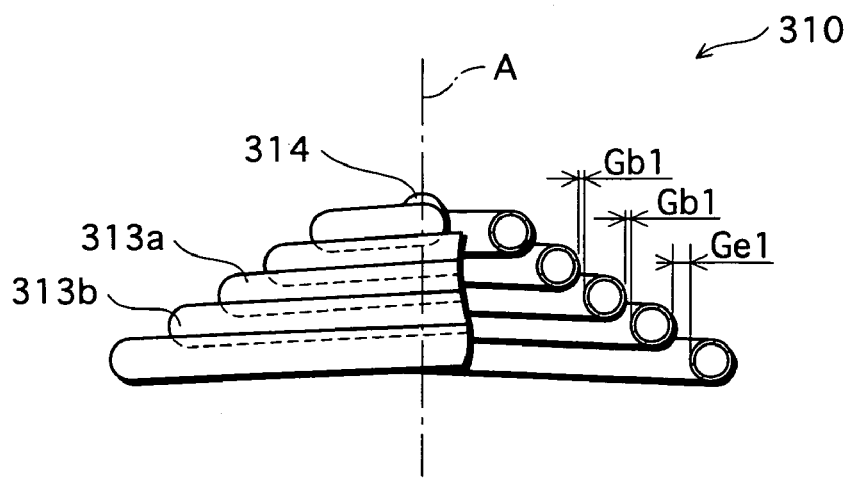

FIGS. 10A and 10B are diagrams respectively showing an intermediate body. Specifically, FIG. 10A shows a plan view and FIG. 10B shows a partly-broken front view.

As shown in FIGS. 10A and 10B, an intermediate body 310 is made up of: a central-portion scheduled portion 312; a first-end-portion scheduled portion 311a; a second-end-portion scheduled portion 311b; a first-flat-spiral-portion scheduled portion 313a formed between the central-portion scheduled portion 312 and the first-end-portion scheduled portion 311a; and a second-flat-spiral-portion scheduled portion 313b formed between the central-portion scheduled portion 312 and the second-end-portion scheduled portion 311b. The intermediate body 310 is formed substantially in a circular cone shape having a tubular axis winding in double spiral configuration.

The central-portion scheduled portion 312 is a portion to be formed into the central portion 120 of the flat-spiral glass tube 100, which further corresponds to a turning portion of the double spiral configuration. In addition, the central-portion scheduled portion 312 has a protruding portion 314 whose tube's outer diameter is larger than the counterparts of the first- and second-flat-spiral-portion scheduled portions 313a, 313b, and the first- and second-end-portion scheduled portions 311a, 311b. This protruding portion 314 will be formed into the bulged-out portion 121 of the arc tube 10. The protruding portion 314 is formed by partially softening the vertex of the intermediate body 310 thereby heightening the pressure inside the intermediate body 310. This protruding portion 314 may be formed immediately after winding the glass tube 300 along the conical surface of the jig 320. Alternatively, the protruding portion 314 may be formed after removal of the intermediate body 310 from the jig 320.

As shown in FIG. 10B, a distance Gb1 between adjacent exterior walls of the intermediate body 310 measured in the direction substantially orthogonal to the straight line A is substantially uniform and specifically is 2 mm (i.e. measured in a direction parallel to a plane that includes the tubular axis 101 of the flat-spiral glass tube 100), where the adjacent exterior walls respectively belong to a first substantial part of the first-flat-spiral-portion scheduled portion 313a of the intermediate body 310; and a second substantial part of the second-flat-spiral-portion scheduled portion 313b of the intermediate body 310.

On the other hand, with respect to the other part of the first-flat-spiral-portion scheduled portion 313a except for the first substantial part and with respect to the other part of the second-flat-spiral-portion scheduled portion 313b except for the second substantial part, the distance corresponding to the distance Gb1 gradually increases in the direction towards the first- and second-end-portion scheduled portions 311a and 311b, respectively. In the above explanation, "the other part of the first-flat-spiral-portion scheduled portion 313a except for the first substantial part" corresponds to a part of the first-flat-spiral-portion scheduled portion 313a that is closer to the first-end-portion scheduled portion 311a than to the central-portion scheduled portion 312. Likewise, "the other part of the second-flat-spiral-portion scheduled portion 313b except for the second substantial part" corresponds to a part of the second-flat-spiral-portion scheduled portion 313b that is closer to the second-end-portion scheduled portion 311b than to the central-portion scheduled portion 312.

Regarding the above-stated explanation relating to the distance Gb1, the first substantial part starts from a corresponding position P3 towards the central-portion scheduled portion 312 in the direction of the tubular axis, and the second substantial part starts from a corresponding position P3 towards the central-portion scheduled portion 312 in the direction of the tubular axis. Here, each of the positions P3 corresponds to ¼ turn from a corresponding one of the first- and second-end-portion scheduled portions 311a and 311b along the tubular axis towards the central-portion scheduled portion 312.

Note that the positions P3 are not limited to the concrete example described above. For example, the positions P3 may be positioned ½ turn from the corresponding first- and second-end-portion scheduled portions 311a and 311b along the tubular axis towards the central-portion scheduled portion 312, respectively. However, it is still preferable to set the positions P3 so that the first and second substantial parts exclude the outermost layers of the intermediate body 310 respectively belonging to the first- and second-flat-spiral-portion scheduled portions 313a and 313b.

As shown in FIG. 10A, the straight line L5 connecting the position P3 and the central-portion scheduled portion 312 is substantially orthogonal to the straight line L6 connecting the first-end-portion scheduled portion 311a, the second-end-portion scheduled portion 311b, and the central-portion scheduled portion 312. In other words, the straight line L5 intersects the straight line L6 with an angle of approximately 90°.

The first- and second-end-portion scheduled portions 311a and 311b are the portions to be heated by means of a burner and the like in the electrodes-providing process, and further to be stored in the bases 20a and 20b respectively.

A distance Ge1 is 5 mm, which is longer than the distance Gb1, where the distance Ge1 is measured in the direction parallel to a plane including the tubular axis 101 of the flat-spiral glass tube 100 and is: between adjacent exterior walls respectively belonging to the first-end-portion scheduled portion 311a and the second-flat-spiral-portion scheduled portion 313b; and between adjacent exterior walls respectively belonging to the second-end-portion scheduled portion 311b and the first-flat-spiral-portion scheduled portion 313a. Here, the direction parallel to a plane including the tubular axis 101 corresponds to the direction substantially orthogonal to the straight line A.

The shape of the intermediate body 310 is not limited to a circular cone, and may alternatively be a polygonal cone.

3. Flattening Process

The following describes the flattening process in detail.

As shown in FIGS. 7A, 7B, and 7C, a flattening apparatus 340 is used to produce a flat-spiral glass tube 100 out of an intermediate body 310. The flattening apparatus 340 is made up of a movable plate 341, a fixed plate 342, a plurality of guiding rods 343, and a plurality of restriction members 344.

The movable plate 341 and the fixed plate 342 are for example made of stainless steel. While in actual use, the movable plate 341 is to be positioned above the fixed plate 342 with the intermediate body 310 sandwiched therebetween. The movable plate 341 is capable of moving in the vertical direction while maintaining the parallel condition with respect to the fixed plate 342. In addition, a through hole 345 is provided through the substantially center of the movable plate 341, so as to store therein the protruding portion 314 of the intermediate body 310.

The guiding rods 343 are provided on the upper surface of the fixed plate 342 so as to stand upright, and pass through corresponding holes of the movable plate 341. The holes of the movable plate 341 are not shown in the drawings. The restriction members 344 are provided for the four corners of the upper surface of the fixed plate 342, to prevent the movable plate 341 from approaching the fixed plate 342 too near.

To commence the flattening process, the intermediate body 310 is placed between the movable plate 341 and the fixed plate 342, as shown in FIG. 7A. The intermediate body 310 is placed in the substantial center of the upper plate of the fixed plate 342, with the protruding portion 314 positioned immediately below the through hole 345 of the movable plate 341. In this state, the movable plate 341, in the vicinity of the through hole 345, is abut on the upper surface of the first- and second-flat-spiral-portion scheduled portions 313a and 313b of the intermediate body 310.

Next, while the movable plate 341 is abut on the first- and second-flat-spiral-portion scheduled portions 313a and 313b, the intermediate body 310 is subjected to heating so that the temperature of the outer surface of the intermediate body 310 becomes approximately 620° C., as shown in FIG. 7B. Note that the temperature of 620° C. is a temperature enabling firing of the phosphor applied to the inner surface of the intermediate body 310. Accordingly, by raising the temperature of the outer surface of the intermediate body 310 to about 620° C., a phosphor layer will be formed on the inner surface of the intermediate body 310.

The temperature, to which the outer surface of the intermediate body 310 is to be heated, is not limited to 620° C., but should be preferably lower than 675° C., which is the softening point of glass (soft glass). If the temperature of the intermediate body 310 exceeds the softening point of glass, the glass deforms by gravity, making it difficult to maintain the shape of the intermediate body 310. In addition, if the temperature is raised up to around the softening point of glass, failures are expected such as the phosphor layer having been formed in the inner surface of the intermediate body 310 starts coming off.

When the temperature of the outer surface of the intermediate body 310 reaches 620° C., the intermediate body 310 starts to allow plastic deformation, enabling the movable plate 341 to lower by gravity. In other words, the intermediate body 310 starts being compressed in the vertical direction to be deformed. Note that the lowering of the movable plate 341 will stop when the movable plate 341 is made abut to the restriction members 344.

As shown in FIG. 7C, when the movable plate 341 is in the condition abut to the restriction members 344, the flattening of the intermediate body 310 stops thereby completing the flat-spiral glass tube 100.

MODIFICATION EXAMPLES

So far, the present invention has been described based on an embodiment. However, it is needless to say that the present invention should not be limited to the concrete examples shown by the above-described embodiment. For example, the following modification examples are possible in the present invention.

Figure 11A:
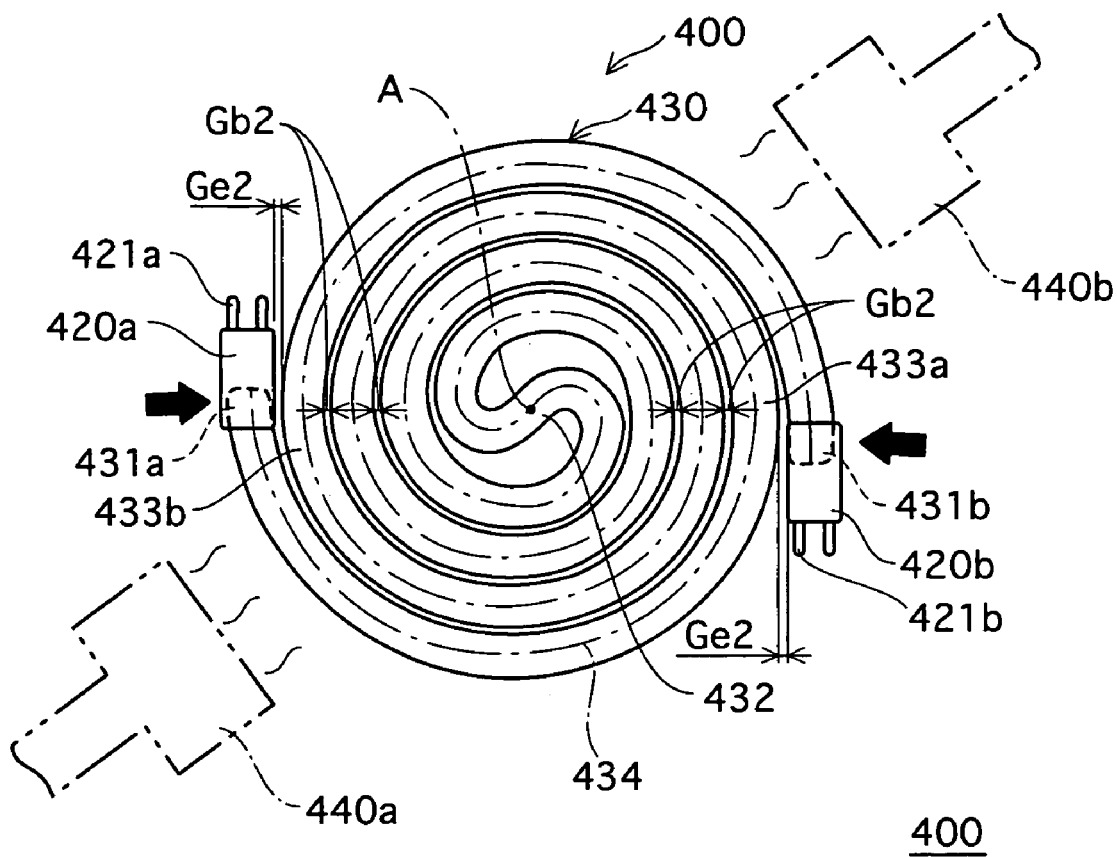
FIGS. 11A and 11B are diagrams respectively showing a fluorescent lamp according to a modification example, FIG. 11A showing a plan view, and FIG. 11B showing a front view.
Figure 11B:
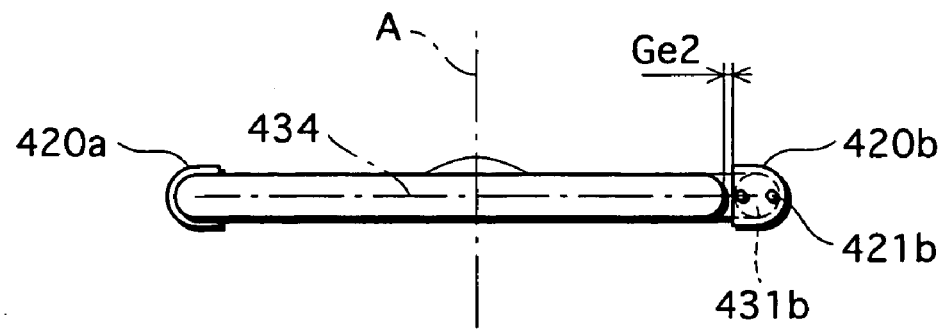

FIGS. 11A and 11B are diagrams respectively showing a fluorescent lamp according to a modification example. Specifically, FIG. 11A shows a plan view, and FIG. 11B shows a front view. As shown in FIGS. 11A and 11B, a fluorescent lamp 400 according to this modification example is made up of an arc tube 410, and bases 420a and 420b respectively attached to ends of the arc tube 410.

The arc tube 410 is obtained by re-processing the arc tube 10 of the fluorescent lamp 1 according to the above-described embodiment. Specifically, the arc tube 410 is made up of a flat-spiral glass tube 430 having the shape substantially of a disc whose tubular axis 434 winds around the straight line A in double spiral configuration and lies, for the most part, in one plane substantially orthogonal to the straight line A. The flat-spiral glass tube 430 is made up of: a central portion 432; first and second end portions 431a and 431b that oppose each other with the central portion 432 therebetween; a first flat-spiral portion 433a formed between the central portion 432 and the first end portion 431a; and a second flat-spiral portion 433b formed between the central portion 432 and the second end portion 431b.

The fluorescent lamp 400 according to the modification example is produced as follows. Electrodes (not shown in the drawing) are sealed respectively in the first end portion 431a and the second end portion 431b of the flat-spiral glass tube 430. A predetermined position in the vicinity of the first end portion 431a and a predetermined position in the vicinity of the second end portion 431b are heated to be softened using burners 440a, 440b, and the like. Then finally, the first and second end portions 431a and 431b are bent towards the central portion 432. This manner of production enables the distance Ge2 to be substantially the same as the distance Gb2.

The base 420a has a pair of power-source connection terminal pins 421a. Likewise, the base 420b has a pair of power-source connection terminal pins 421b. The base 420a (and the base 420b) is open at the side thereof closer to the central portion 432 of the flat-spiral glass tube 430, so that the first end portion 431a (and the second end portion 431b) is exposed from the opened portion of the base 420a (and of the base 420b). This structure enables the bases 420a and 420b from abutting the first and second flat-spiral portions 433a and 433b, even if the distance Ge2 is short.

The distance Ge2 is preferably 0.5 mm or greater and less than 3 mm, where the distance Ge2 corresponds to: a distance between adjacent exterior walls respectively belonging to the first end portion 431a and the second flat-spiral portion 433b; and a distance between adjacent exterior walls respectively belonging to the second end portion 431b and the first flat-spiral portion 433a. If the distance Ge2 is confined in the range between 0.5 mm or greater and less than 3 mm, it becomes possible to obtain a small fluorescent lamp 400 as well as reducing the color inconsistency of the light-emission surface. In particular, if the distance Ge2 is less than 3 mm, the distance Ge2 will be about the same in length as the distance Gb2, thereby enabling the fluorescent lamp 400 to exhibit a favorable appearance.

The manufacturing method of arc tube according to the present invention is applicable in manufacturing an arc tube substantially in a disc shape whose tubular axis winds in double spiral configuration and lies, for the most part, in one plane. The manufacturing method is also applicable in manufacturing a fluorescent lamp equipped with the arc tube.

Although the present invention has been fully described by way of examples with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A manufacturing method of an arc tube including a flat-spiral glass tube, the flat-spiral glass tube being made up of: a central portion; a first end portion; a second end portion; a first flat-spiral portion formed between the central portion and the first end portion; and a second flat-spiral portion formed between the central portion and the second end portion, the flat-spiral glass tube being made of a glass tube including a central-portion scheduled portion, a first-end-portion scheduled portion, a second-end-portion scheduled portion, a first-flat-spiral-portion scheduled portion, and a second-flat-spiral-portion scheduled portion, the manufacturing method comprising:

a first step of forming the glass tube into a substantially circular cone shape, by holding the central-portion scheduled portion of the glass tube in softened state to a vertex of a jig having a substantially circular cone shape, and winding to a conical surface of the jig at least the first-flat-spiral-portion scheduled portion and the second-flat-spiral-portion scheduled portion;

a second step of flattening the glass tube formed in the substantially circular cone shape into a substantially disc shape so that part of a tubular axis of the glass tube, which corresponds to the first-flat-spiral-portion scheduled portion and the second-flat-spiral-portion scheduled portion, is substantially included in a plane;

a third step of, after the second step, providing the first end portion and the second end portion with a corresponding electrode; and a fourth step of, after the third step, a) bending a portion of the first flat-spiral portion including the first end portion so that the first end portion approaches the second flat-spiral portion, and b) bending a portion of the second flat-spiral portion including the second end portion so that the second end portion approaches the first flat-spiral portion, wherein a distance Gb1 is substantially uniform, where the distance Gb1 is measured in a parallel direction to the plane and is between adjacent exterior walls of the circular-cone-shaped glass tube respectively belonging to a first substantial part of the first-flat-spiral-portion scheduled portion and a second substantial part of the second-flat-spiral-portion scheduled portion, a distance Ge1 is longer than the distance Gb1, where the distance Ge1 is measured in the parallel direction to the plane and is between adjacent exterior walls of the circular-cone-shaped glass tube respectively belonging to the first-end-portion scheduled portion and the second-flat-spiral-portion scheduled portion; and between adjacent exterior walls of the circular-cone-shaped glass tube respectively belonging to the second-end-portion scheduled portion and the first-flat-spiral-portion scheduled portion, and after the fourth step, a distance Ge2 is substantially the same distance as a distance Gb2, where the distance Ge2 is measured in the parallel direction to the plane and is; between adjacent exterior walls of the flat-spiral glass tube respectively belonging to the first end portion and the second flat-spiral portion; and between adjacent exterior walls of the flat-spiral portion, and the distance Gb2 is measured in the parallel direction to the plane and is between adjacent exterior walls of the flat-spiral glass tube respectively belonging to the first flat-spiral portion and the second flat-spiral portion.

2. The manufacturing method of claim 1, wherein
the first substantial portion excludes an outermost layer of the first-flat-spiral-portion scheduled portion, and the second substantial portion excludes an outermost layer of the second-flat-spiral-portion scheduled portion.

3. The manufacturing method of claim 2, wherein
the conical surface of the jig is provided with a guiding groove onto which the glass tube is wound, the guiding groove having a substantially uniform winding pitch Dpo and a winding pitch Dpe that is longer than the winding pitch Dpo,
the winding pitch Dpo corresponding in position to where the first substantial part and the second substantial part are to be positioned on the guiding groove, and the winding pitch Dpe corresponding in position to where the first-end-portion scheduled portion and the second-end-portion scheduled portion are to be positioned on the guiding groove.

4. The manufacturing method of claim 3,
the winding pitch Dpo is in a range of 0.5 mm to 2 mm, inclusive, and the winding pitch Dpe is in a range of 3 mm to 10 mm, inclusive.

5. The manufacturing method of claim 4, further comprising:
a third step of, after the second step, providing the first end portion and the second end portion with a corresponding electrode; and
a fourth step of, after the third step, a) bending a portion of the first flat-spiral portion including the first end portion so that the first end portion approaches the second flat-spiral portion, and b) bending a portion of the second flat-spiral portion including the second end portion so that the second end portion approaches the first flat-spiral portion.

6. The manufacturing method of claim 5,
after the fourth step, a distance Ge2 is in a range between 0.5 mm or greater and smaller than 3 mm, where the distance Ge2 is measured in the parallel direction to the plane and is: between adjacent exterior walls of the flat-spiral glass tube respectively belonging to the first end portion and the second flat-spiral portion; and between adjacent exterior walls of the flat-spiral glass tubes respectively belonging to the second end portion and the first flat-spiral portion.

7. The manufacturing method of claim 1, wherein
the conical surface of the jig is provided with a guiding groove onto which the glass tube is wound, the guiding groove having a substantially uniform winding pitch Dpo and a winding pitch Dpe that is longer than the winding pitch Dpo,
the winding pitch Dpo corresponding in position to where the first substantial part and the second substantial part are to be positioned on the guiding groove, and the winding pitch Dpe corresponding in position to where the first-end-portion scheduled portion and the second-end-portion scheduled portion are to be positioned on the guiding groove.

8. The manufacturing method of claim 7, wherein
the winding pitch Dpo is in a range of 0.5 mm to 2 mm, inclusive, and the winding pitch Dpe is in a range of 3 m to 10 mm, inclusive.

9. The manufacturing method of claim 1, further comprising:
a third step of, after the second step, providing the first end portion and the second end portion with a corresponding electrode; and
a fourth step of, after the third step, a) bending a portion of the first flat-spiral portion including the first end portion so that the first end portion approaches the second flat-spiral portion, and b) bending a portion of the second flat-spiral portion including the second end portion so that the second end portion approaches the first flat-spiral portion.

10. The manufacturing method of claim 9, wherein
after the fourth step, a distance Ge2 is in a range between 0.5 mm or greater and smaller than 3 mm, where the distance Ge2 is measured in the parallel direction to the plane and is: between adjacent exterior walls of the flat-spiral glass tube respectively belonging to the first end portion and the second flat-spiral portion; and between adjacent exterior walls of the flat-spiral glass tubes respectively belonging to the second end portion and the first flat-spiral portion.

11. The manufacturing method of claim 1 further including, after the first step, providing a phosphor layer to an interior of the substantially circular cone shape glass tube and during the second step of flattening the substantially circular cone shape with the layer of phosphor providing sufficient heat to both fire the phosphor layer and to bend the substantially circular cone shape to the flat-spiral configuration wherein the phosphor layer is cured with the same heat that enables the flattening of the second step.

12. An arc tube comprising:
a flat-spiral glass tube made up of a central portion, a first end portion, a second end portion, a first flat-spiral portion formed between the central portion and the first end portion, and a second flat-spiral portion formed between the central portion and the second end portion, where part of a tubular axis of the flat-spiral glass tube, which corresponds to the first flat-spiral portion and the second flat-spiral portion, is substantially included in a plane; and two electrodes, each of which is provided at a corresponding one of the first end portion and the second end portion, wherein the flat-spiral glass tube is made of a glass tube including a central-portion scheduled portion, a first-end-portion scheduled portion, a second-end-portion scheduled portion, a first-flat-spiral-portion scheduled portion, and a second-flat-spiral-portion scheduled portion, the flat-spiral glass tube is made by flattening the glass tube formed substantially in a circular cone shape into a substantially disc shape so that part of a tubular axis of the glass tube, which corresponds to the first-flat-spiral-portion scheduled portion and the second-flat-spiral-portion scheduled portion, is included in the plane, and a distance Gb1 is substantially uniform, where the distance Gb1 is measured in a parallel direction to the plane and is between adjacent exterior walls of the circular-cone-shaped glass tube respectively belonging to a first substantial part of the first-flat-spiral-portion scheduled portion and a second substantial part of the second-flat-spiral-portion scheduled portion, a distance Ge1 is longer than the distance Gb1, where the distance Ge1 is measured in the parallel direction to the plane and is between adjacent exterior walls of the circular-cone-shaped glass tube respectively belonging to the first-end-portion scheduled portion and the second-flat-spiral-portion scheduled portion; and between adjacent exterior walls of the circular-cone-shaped glass tube respectively belonging to the second-end-portion scheduled portion and the first-flat-spiral-portion scheduled portion, and a distance Ge2 is in a range between 0.5 mm or greater and smaller than 3 mm and is substantially the same distance as a distance Gb2, where the distance Ge2 is measured in the parallel direction to the plan and is: between adjacent exterior walls of the flat-spiral glass tube respectively belonging to the first end portion and the second flat-spiral portion; and between adjacent exterior walls of the flat-spiral glass tubes respectively belonging to the second end portion and the first flat-spiral portion, and the distance Gb2 is measured in the parallel direction to the plane and is between adjacent exterior walls of the flat-spiral glass tube respectively belonging to the first flat-spiral portion and the second flat-spiral portion.

13. The arc tube of claim 12, wherein the first substantial portion excludes an outermost layer of the first-flat-spiral-portion scheduled portion, and the second substantial portion excludes an outermost layer of the second-flat-spiral-portion scheduled portion.

14. The arc tube of claim 12, wherein the distance Gb1 is in a range of 0.5 mm to 2 mm, inclusive, and the distance Ge1 is in a range of 3 mm to 10 mm, inclusive.

15. The arc tube of claim 12, wherein after the first end portion and the second end portion are provided with a corresponding one of the electrodes, a) a portion of the first flat-spiral portion including the first end portion is bent so that the first end portion approaches the second flat-spiral portion, and b) a portion of the second flat-spiral portion including the second end portion is bent so that the second end portion approaches the first flat spiral portion.

16. A fluorescent lamp comprising the arc tube of claim 12.

* * * * *